(12) United States Patent  (10) Patent No.: US 7,775,726 B2
Pepin et al.  (45) Date of Patent: Aug. 17, 2010

(54) REMOTE GRIP OPTICAL FIBER CONNECTOR

(75) Inventors: Ronald P. Pepin, Georgetown, TX (US);
James R. Bylander, Austin, TX (US);
Paul M. Wendell, Grand Canyon, AZ (US); Johnny P. Bryant, Austin, TX (US); Carl E. Fisher, Austin, TX (US); Donald K. Larson, Cedar Park, TX (US); Sidney J. Berglund, Round Rock, TX (US); Takaya Yamauchi, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/057,824

(22) Filed: Mar. 28, 2008

(65) Prior Publication Data

US 2008/0226236 A1 Sep. 18, 2008

Related U.S. Application Data

(63) Continuation-in-part of application No. PCT/US2008/053284, filed on Feb. 7, 2008.

(60) Provisional application No. 60/890,371, filed on Feb. 16, 2007.

(51) Int. Cl.
*G02B 6/36* (2006.01)
(52) U.S. Cl. .......................... 385/78; 385/81
(58) Field of Classification Search ............... 385/78, 385/81, 73–77, 83
See application file for complete search history.

(56) References Cited

U.S. PATENT DOCUMENTS

| 4,240,695 | A | * | 12/1980 | Evans ........................... 385/62 |
| 4,309,071 | A | | 1/1982 | Prunier |
| 4,368,948 | A | | 1/1983 | Despouys |
| 4,679,895 | A | | 7/1987 | Huber |
| 4,684,205 | A | | 8/1987 | Margolin et al. |
| 4,892,378 | A | | 1/1990 | Zajac et al. |
| 4,961,624 | A | | 10/1990 | Savitsky et al. |
| 4,964,685 | A | | 10/1990 | Savitsky et al. |
| 5,080,460 | A | | 1/1992 | Erdman et al. |
| 5,088,804 | A | | 2/1992 | Grinderslev |
| 5,102,211 | A | | 4/1992 | Slaney et al. |
| 5,159,655 | A | | 10/1992 | Ziebol et al. |
| 5,179,608 | A | | 1/1993 | Ziebol et al. |

(Continued)

FOREIGN PATENT DOCUMENTS

FR 2464490 3/1981

(Continued)

*Primary Examiner*—Ellen Kim
(74) *Attorney, Agent, or Firm*—Gregg H. Rosenblatt

(57) ABSTRACT

An optical connector for terminating an optical fiber comprises a housing configured to mate with a receptacle and a collar body disposed in the housing. The collar body includes a ferrule securely disposed in an opening of the collar body, the ferrule including a central bore that defines an axis, and a housing portion disposed in a generally central portion of the collar body. The housing portion includes an opening to receive a gripping device to grip an optical fiber. The ferrule is axially moveable independent of the axial movement of the optical fiber and gripping device. The optical connector can be thermally balanced over a temperature range of at least 100° C.

17 Claims, 14 Drawing Sheets

U.S. PATENT DOCUMENTS

| | | | |
|---|---|---|---|
| 5,189,717 A * | 2/1993 | Larson et al. | 385/95 |
| 5,337,390 A * | 8/1994 | Henson et al. | 385/81 |
| 5,408,558 A | 4/1995 | Fan | |
| 5,414,790 A | 5/1995 | Lee et al. | |
| 5,694,506 A | 12/1997 | Kobayashi et al. | |
| 5,732,174 A * | 3/1998 | Carpenter et al. | 385/72 |
| 5,761,360 A * | 6/1998 | Grois et al. | 385/81 |
| 5,812,718 A | 9/1998 | Carpenter et al. | |
| 5,862,289 A | 1/1999 | Walter et al. | |
| 6,422,764 B1 | 7/2002 | Marrs | |
| 6,913,394 B2 | 7/2005 | Iwano et al. | |
| 7,011,454 B2 | 3/2006 | Caveney et al. | |
| 7,140,787 B2 * | 11/2006 | Yamauchi et al. | 385/98 |
| 7,140,950 B1 | 11/2006 | Bylander et al. | |
| 7,194,179 B1 | 3/2007 | Bryant et al. | |
| 7,220,061 B2 | 5/2007 | De Marchi | |
| 7,280,733 B2 | 10/2007 | Larson et al. | |
| 7,331,718 B2 | 2/2008 | Yazaki et al. | |
| 7,377,700 B2 | 5/2008 | Manning et al. | |
| 7,454,117 B2 * | 11/2008 | Carpenter et al. | 385/137 |
| 2002/0097510 A1 | 7/2002 | Jokura | |
| 2005/0063662 A1 * | 3/2005 | Carpenter | 385/136 |
| 2006/0171639 A1 | 8/2006 | Dye | |
| 2008/0019646 A1 | 1/2008 | deJong | |
| 2008/0118206 A1 * | 5/2008 | Wagner et al. | 385/81 |
| 2008/0310797 A1 | 12/2008 | Yazaki et al. | |

FOREIGN PATENT DOCUMENTS

| | | |
|---|---|---|
| JP | 09-318836 | 12/1997 |
| JP | 3445479 | 6/2003 |
| WO | WO 2006/019515 | 2/2006 |
| WO | WO 2006/019516 | 2/2006 |
| WO | 2007/053496 A1 | 5/2007 |

* cited by examiner

REMOTE GRIP OPTICAL FIBER CONNECTOR

CROSS REFERENCE TO RELATED APPLICATIONS

This application is a continuation-in-part of PCT Application No. PCT/US2008/053284, filed Feb. 7, 2008, which claims the benefit of U.S. Provisional Patent Application No. 60/890,371, filed Feb. 16, 2007, the disclosures of which are incorporated by reference in their entirety herein.

BACKGROUND

1. Field of the Invention

The present invention is directed to an optical connector.

2. Related Art

Mechanical optical fiber connectors for the telecommunications industry are known. For example, LC, ST, FC, and SC optical connectors are widely used.

However, commercially available optical connectors are not well suited for outside plant field installations. Typically, an adhesive is required to mount these types of ferrule-based connectors on to an optical fiber. The process of bonding the fiber to the ferrule can be awkward and time consuming to perform in the field. Also post-assembly polishing requires that the craftsman have a higher degree of skill.

Remote grip optical fiber connectors are also known, such as those described in U.S. Pat. No. 5,337,390. These connectors employ a mechanical gripping element to secure the optical fiber as opposed to an adhesive.

Also known are hybrid optical splice connectors, as described in JP Patent No. 3445479, JP Application No. 2004-210251 (WO 2006/019516) and JP Application No. 2004-210357 (WO 2006/019515). However, these hybrid splice connectors are not compatible with standard connector formats and require significant piecewise assembly of the connector in the field. The handling and orientation of multiple small pieces of the connector can result in incorrect connector assembly that may either result in decreased performance or increase the chance of damaging the fiber.

Also known are connectors that incorporate fiber stubs that are factory installed. In these connectors, the back end of the stub fiber is mechanically spliced to a field fiber, where an index matching gel is used to fill the gap between the back end of the fiber stub and the front end of the terminated fiber. For outdoor applications, especially for environments that can undergo a wide temperature variation, the index of refraction of the gel may change as a function of temperature leading to more reflections, thus limiting the connector performance in those particular applications.

Another effect that can occur is movement of the fiber ends relative to each other, caused by differential thermal expansion over the temperature range. For ferrules with stubs bonded in place, if the fiber projection from the ferrule end is too great, excessive forces can be applied to the fiber end when mated with another connector, which can fracture the bond line and cause mating failure.

SUMMARY OF THE INVENTION

According to a first aspect of the present invention, an optical connector for terminating an optical fiber comprises a housing configured to mate with a receptacle and a collar body disposed in the housing. The collar body includes a ferrule securely disposed in an opening of the collar body, the ferrule including a central bore that defines an axis, a flexible wall structure, and a housing portion disposed in a generally central portion of the collar body. The housing portion includes an opening to receive a gripping device to grip an optical fiber. The ferrule is axially moveable independent of the axial movement of the optical fiber and gripping device.

In another aspect the gripping device includes a gripping element and an actuating cap, where the gripping element comprises a ductile material having a focus hinge that couples first and second element legs, each of the legs including a fiber gripping channel to clamp an optical fiber received therein upon actuation by the actuating cap.

In another aspect, the housing portion of the collar body includes a nest to receive the gripping element, where a first portion of the received gripping element is registered against an inner wall of the housing portion and a second portion of the received gripping element engages an elastic element disposed in the housing portion of the collar body. In one aspect, the elastic element comprises a spring arm.

In another aspect, the actuating cap comprises one or more cam bars located on an interior portion of the cap that engage the element legs, urging the element legs toward one another, during actuation, where the cap is configured to freely fit within the housing portion such that upon actuation the cap expands and contracts with the gripping element during changes in operating temperature. In one aspect, the gripping element and actuating cap are formed from a same material.

In another aspect, the collar body further includes a buffer clamp to clamp a buffer portion of the optical fiber cable that houses the optical fiber.

In another aspect, the ferrule and collar body define a first path and the gripped optical fiber and gripping device form a second path, where the first and second paths have substantially the same effective overall CTE so that the path lengths change in substantially the same amount with a temperature change.

In another aspect, upon actuation of the gripping device and upon connection of the optical fiber connector to one of a connector coupling, a connector adapter and a connector socket, an end load of less than about 20% of a total load force is directly applied to the optical fiber.

In another aspect, the flexible wall structure comprises bowed outer walls of the collar body, wherein a portion of a displacement force applied to the ferrule is transferred to the bowed outer walls.

In another aspect of the present invention, an optical fiber connector comprises a housing configured to mate with a receptacle and a collar body disposed in the housing. The collar body includes a ferrule securely disposed in an opening of the collar body. The ferrule includes a central bore that defines an axis. The collar body also includes a housing portion disposed in a generally central portion of the collar body, having an opening to receive a gripping device to grip an optical fiber, where the ferrule is axially moveable independent of the axial movement of the optical fiber and gripping device. The optical fiber connector also includes a cam pin. When the gripping element is disposed in the housing portion, a portion of the gripping device registers against a first portion of the cam pin, and the cam pin engages the gripping device such that gripping device is axially displaced towards the ferrule upon actuation of the cam pin to generate a fiber protrusion. In one aspect, the cam pin is received by a through hole formed in the collar body transverse to the fiber axis, where the cam pin comprises a cylindrically-shaped structure insertable into the through hole. In another aspect, the cam pin includes a first portion having a first diameter and a second portion having a second diameter larger than the first diameter.

In another aspect of the present invention, an optical connector comprises a housing configured to mate with a receptacle and a collar body disposed in the housing. The connector also includes a gripping device to grip an optical fiber, the gripping device including a fiber gripping element and an actuating cap configured to engage the gripping element. The collar body includes a ferrule securely disposed in an opening of the collar body, the ferrule including a central bore that defines an axis. The collar body also includes a housing portion disposed in a generally central portion of the collar body and having an opening to receive the gripping device, where the gripping element comprises a ductile material having a focus hinge that couples first and second element legs. Each of the legs includes a fiber gripping channel to clamp the optical fiber received therein upon actuation by the actuating cap. The connector is thermally balanced over a temperature range of at least 100° C.

In one aspect, the cap is registered to the collar body, where the collar body and cap are formed of a first material, and where the element is formed of a second material. The actuation cap has a CTE in a fiber axis direction that is substantially different from a CTE of the collar body in the same fiber axis direction. In one aspect, the actuation cap has a CTE in a fiber axis direction that is greater than the CTE of the collar body in the same fiber axis direction.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1:
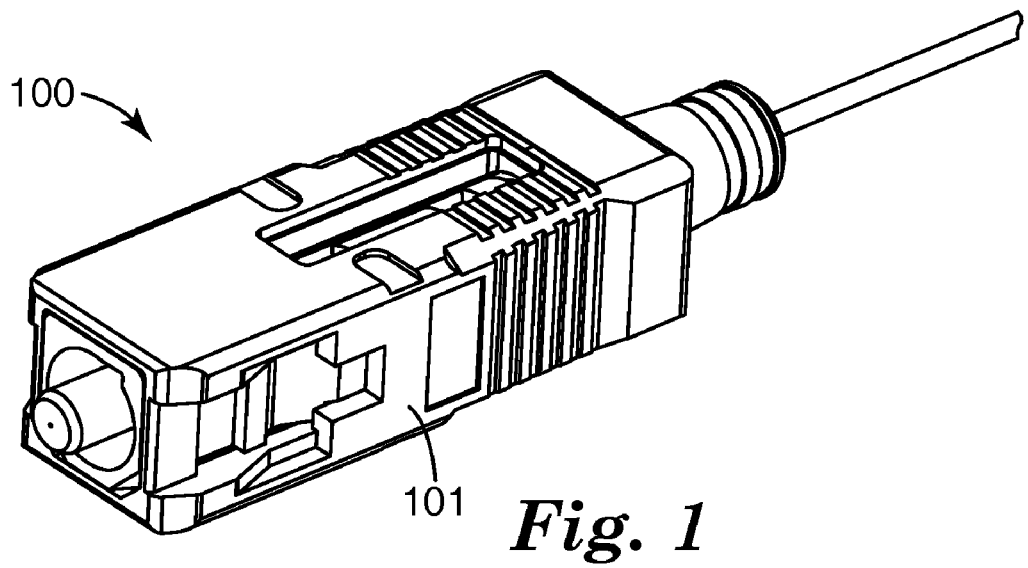
FIG. 1 is an isometric view of an exemplary optical connector housing according to an aspect of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to an optical connector. In particular, the optical connector of the exemplary embodiments provides an enhanced thermal stability over a wide temperature range. In one exemplary aspect, an optical connector is configured such that the position of the fiber end face with respect to the ferrule end face remains substantially constant over a wide temperature range. In alternative embodiments, the fiber end face can be positioned flush with the ferrule end face or the fiber end face can protrude from the ferrule end face at a predetermined protrusion distance. Using the exemplary structures herein, the contact force applied to the terminated fiber can be kept at a suitable level during connections made over a wide temperature range.

Figure 6:
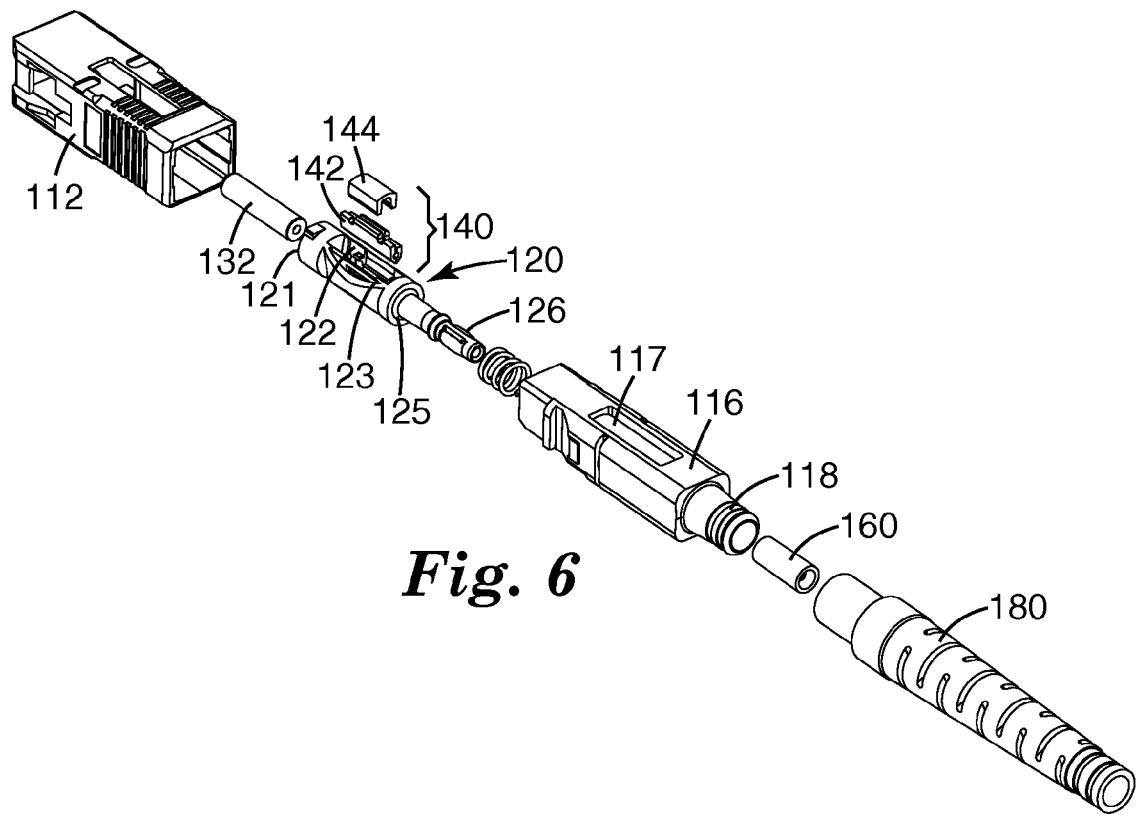
FIG. 6 is an exploded view of an exemplary optical connector according to an aspect of the present invention.

According to a first exemplary embodiment of the present invention, an optical fiber connector 100 is shown in isometric view in FIG. 1 and in exploded view in FIG. 6. FIGS. 2-5 provide more detailed views of various components of optical connector 100. Optical connector 100 is configured to mate with a receptacle. For example, the receptacle can be a connector coupling, a connector adapter and/or a connector socket. Also, as shown in FIG. 1, exemplary optical connector 100 is configured as having an SC format. However, as would be apparent to one of ordinary skill in the art given the present description, optical connectors having other standard formats, such as ST, FC, and LC connector formats, to name a few, can also be provided.

Optical fiber connector 100 can include a connector body 101 having a housing shell 112 and a fiber boot 180. In this exemplary embodiment shell 112 is configured to be received in an SC receptacle (e.g., an SC coupling, an SC adapter, or an SC socket), and a backbone 116 that is housed inside the shell 112 and that provides structural support for the connector 100. In addition, backbone 116 further includes at least one access opening 117, which can provide access to actuate a gripping device disposed within the connector. Backbone 116 can further include a mounting structure 118 that provides for coupling to the fiber boot 180, which can be utilized to protect the optical fiber from bend related stress losses. According to an exemplary embodiment of the present invention, shell 112 and backbone 116 can be formed or molded from a polymer material, although metal and other suitably rigid materials can also be utilized. Shell 112 is preferably secured to an outer surface of backbone 116 via snap fit.

Connector 100 further includes a collar body 120 that is disposed within the connector housing and retained therein. According to exemplary embodiments, the collar body 120 is a multi-purpose element that can house a gripping device 140 and a fiber buffer clamp (such as buffer clamp portion 126 shown in FIG. 6). In a preferred aspect, the connector 100 includes a displacement mechanism. For the embodiment of FIGS. 1-6, the displacement mechanism comprises a flexible structure, such as an outer flexible wall or bowed walls 127 formed on the collar body 120. This flexible bowed outer wall structure 127 allows optical connector 100 to distribute contact forces in an appropriate manner so that the ferrule and fiber each take on the correct amount of force when the connector is connected.

In addition, the wall structure 127 can behave in a neutral fashion during temperature changes, as the walls would expand and contract to compensate for changes in other parts of the connector. Alternatively, the flexible wall structure can comprise an outer wall structure having a compliant material formed as part of the wall structure. Further detail on the force distribution is described in more detail below. In addition, the flexible outer wall structure provides for a limited axial displacement of the ferrule due to thermal expansion/contraction.

As the structure of the collar body 120 provides for the axial displacement of the ferrule, through this design and through the choice of construction materials for certain components (as is described below), the position of the optical fiber tip or end face with respect to the ferrule end face can remain substantially constant under a wide temperature range, such as the standard Telcordia GR326 range of from about −40° C. to about 75° C., or a range from about −40° C. to about 85° C. Preferably, the fiber tip is positioned flush to the end face of the ferrule. Alternatively, the fiber tip is positioned to protrude from the end face of the ferrule by a predetermined amount.

Also, the collar body is configured to have some limited axial movement within backbone 116. For example, the collar body 120 can include a shoulder 125 that can be used as a flange to provide resistance against a spring 155, interposed between the collar body and the backbone, when the ferrule 132 is inserted in, e.g., a receptacle. According to an exemplary embodiment of the present invention, collar body 120 can be formed or molded from a polymer material, although metal and other suitable materials can also be utilized. For example, collar body 120 can comprise an injection-molded, integral material. The choice of suitable materials for the collar body can be made in accordance with the temperature stability parameters discussed herein.

Structurally, collar body 120 includes a first end portion 121 having an opening to receive and house a ferrule 132. Ferrule 132 can be formed from a ceramic, glass, plastic, or metal material to support the optical fiber being inserted and terminated. In a first exemplary aspect, ferrule 132 is a ceramic ferrule. In another exemplary aspect, ferrule 132 is a glass ferrule. The choice of suitable materials for the ferrule can be made in accordance with the temperature stability parameters discussed in more detail below. The fiber being terminated in the connector can comprise a standard single mode or multimode optical fiber, such as SMF 28 (available from Corning Inc.). Ferrule 132 is preferably disposed flush with flange portion 121a and secured within the collar body portion via an epoxy or other suitable adhesive. Alternatively, ferrule 132 may be friction fit in the first end portion 121 of the collar body 120, such as being fitted and secured against flange portion 121a.

Collar body 120 further includes a housing portion 123 that provides an opening 122 in which the gripping device 140 can be inserted in the central cavity of collar body 120. In an exemplary embodiment, the collar body provides for a limited axial displacement of the gripping device 140 due to thermal expansion/contraction.

In an exemplary embodiment, the gripping device 140 can include an element 142 and an actuating cap 144. Gripping element 142 is mountable in the housing portion 123 of collar body 120 such that it is substantially secured within a fixed element cradle or nest 143 formed within the housing portion. When the element 142 is placed in the cradle or nest 143, a portion of the element is registered against a rear wall 123a of the housing portion 123. The other end of element 142 is disposed against elastic element 129, such as a spring arm.

In a preferred aspect, the gripping element 142 comprises a sheet of ductile material having a focus hinge that couples two legs, where one or both of the legs includes a fiber gripping channel (e.g., a V-type, channel type or U-type groove 147 or a mixture of groove shapes) to optimize clamping forces for a conventional glass optical fiber received therein. In one exemplary embodiment, the element can include a V-groove in one leg and a channel groove in the second leg to yield a three line contact region. The ductile material, for example, can be aluminum or anodized aluminum. Gripping device 140 allows a field technician to grip the optical fiber being terminated remotely from the ferrule. Alternatively, gripping device 140 can be designed to have a shape similar to that of a conventional mechanical splice device, as would be apparent to one of ordinary skill in the art. For example, in one alternative aspect, the gripping device can include a wedge actuated mechanical gripping element.

Cap 144 is preferably configured to engage the gripping element 142 such that the element 142 grips a fiber inserted therein. The cap can be formed or molded from a polymer material, although metal and other suitable materials can also be utilized. In a preferred aspect, the cap 144 can be formed from a material being the same as the material forming the element 142. Alternatively, a material having at least a similar coefficient of thermal expansion (CTE) as the element can be utilized. A description of such an alternative optical fiber connector is described below. Also, the cap's size is designed to freely fit within housing portion 123 such that when it has fully engaged the element, the cap is not restricted from axial expansion/contraction with the element 142 during thermal expansion or contraction.

In operation, as the cap 144 is moved from an open position to a closed position (e.g. downward in the embodiment depicted in FIG. 6), one or more cam bars located on an interior portion of the cap 144 can slide over the element legs, urging them toward one another. The glass portion of the fiber being terminated is placed in the groove 147 formed in the element 142 and is gripped as the element legs are moved toward one another by the cap 144. Thus, once clamped, the fiber may move within the ferrule.

As mentioned above, the exemplary embodiments described herein provide a mechanism that can enhance thermal stability of the connector over a wide temperature range. As mentioned above, the housing portion 123 can further include an elastic element 129, such as a spring arm, to contact a portion of element 142. As temperature conditions change, the element 142 may expand or contract in the axial direction while the spring arm 129 provides some resistance to keep the element 142 in its cradle or nest 143. The axial force provided by spring arm 129 can be selected based on the intended force distribution within the connector over the expected temperature range of operation.

Figure 2:
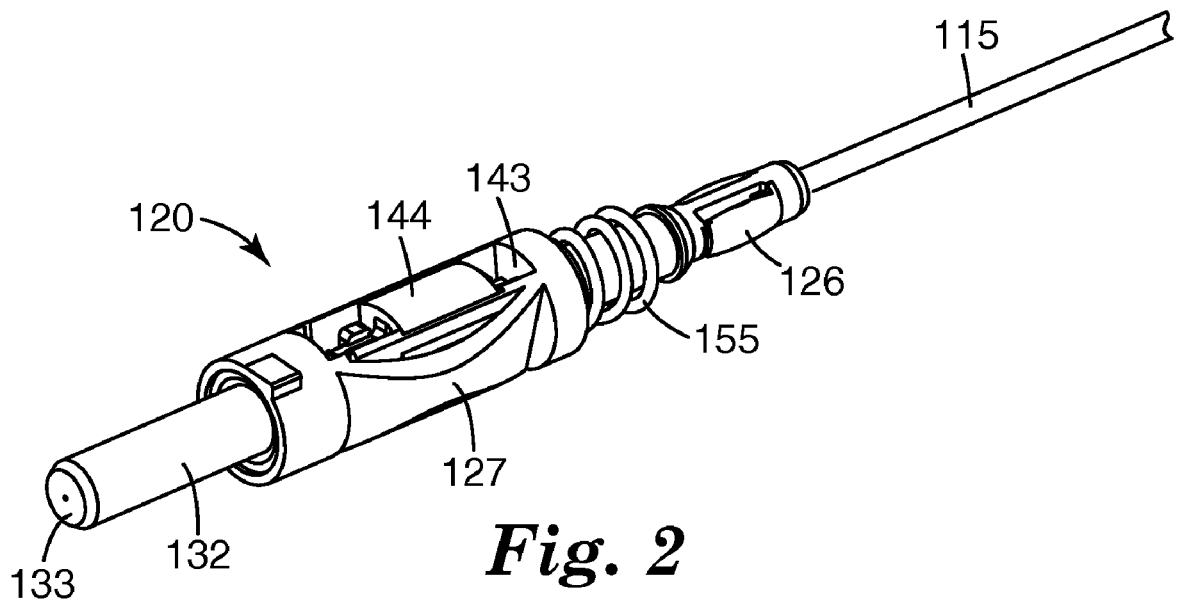
FIG. 2 is an isometric view of an exemplary collar body of an optical connector according to an aspect of the present invention.
Figure 3:
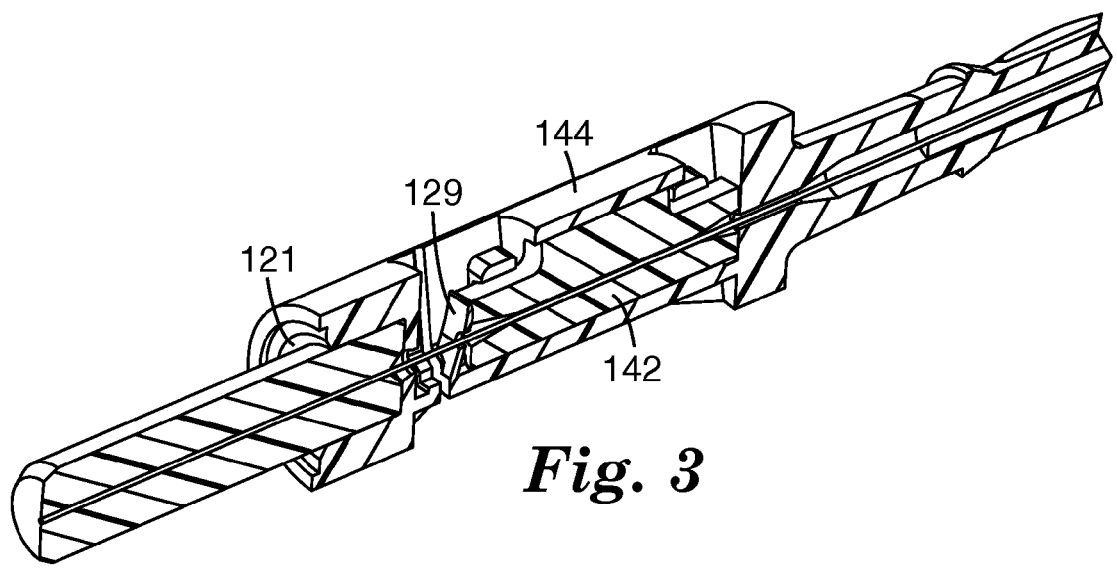
FIG. 3 is an isometric view of an exemplary collar body cross-section according to an aspect of the present invention.
Figure 4:
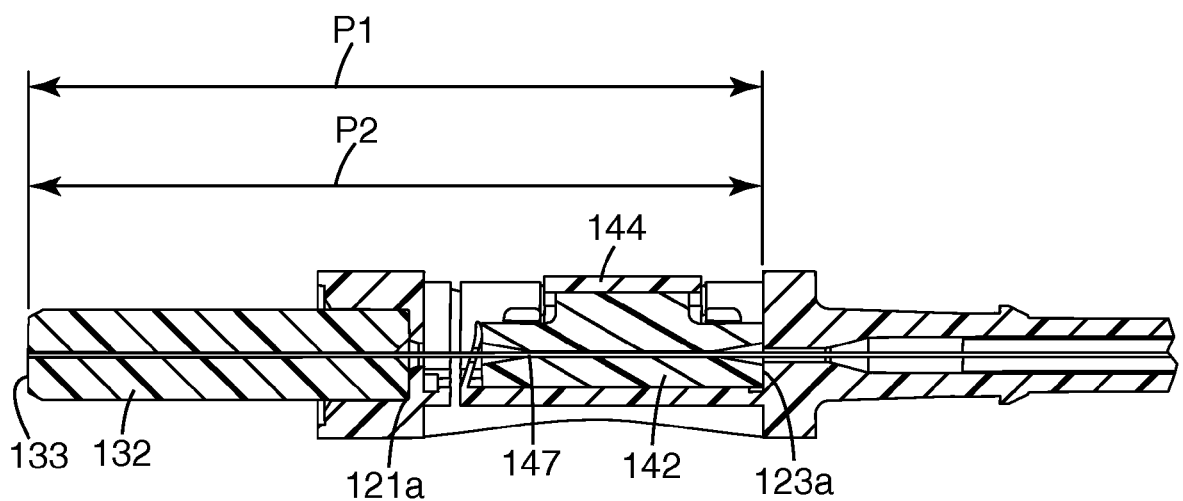
FIG. 4 is a cross-sectional view of an exemplary collar body according to an aspect of the present invention.
Figure 5:
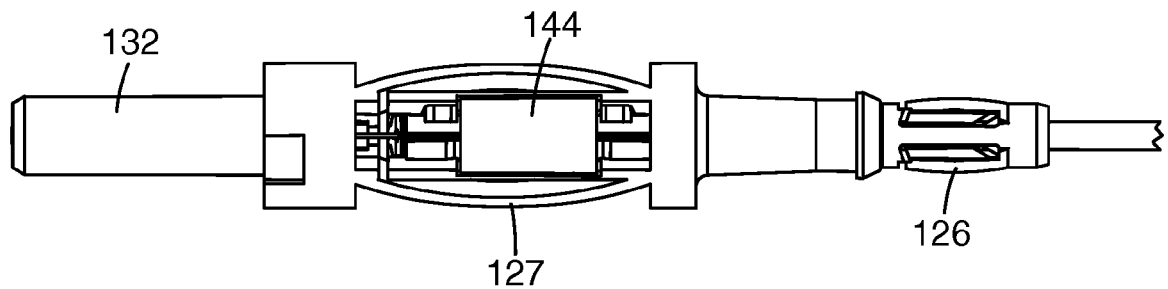
FIG. 5 is a top view of an exemplary collar body according to an aspect of the present invention.

In addition, the collar body is designed to allow for the movement of the ferrule independently of the fiber. As mentioned above, the collar body can include a flexible wall structure. In a preferred aspect, as is shown in FIG. 2, collar body 120 includes bowed sidewalls 127 (only one is shown in the Figure). The bowed sidewalls 127 are flexible and can provide axial movement to the ferrule 132, which is firmly seated against the internal flange 121a of the collar body. Alternatively, the sidewalls can include a compliant material formed in at least a portion thereof to provide suitable flexibility.

Table 1 provides data corresponding to the change in length of various components due to changing temperature over a 120° C. temperature change. In this example, the ferrule is chosen to be a ceramic material, the collar body is formed from a plastic (Vectra), the gripping element is formed from an aluminum material, and the fiber is formed of substantially silica (glass).

TABLE 1

Table of Length Changes with Temperature

| | CTE ppm/° C. | Length Mm | dL/dT nm/° C. | Tmax ° C. | Tmin ° C. | ΔT ° C. | ΔL nm |
|---|---|---|---|---|---|---|---|
| Ceramic Ferrule | 10.6 | 10.0 | −106 | 80 | −40 | 120 | −12720 |
| Plastic Body (Vectra) | 6.0 | 9.5 | −57 | 80 | −40 | 120 | −6840 |
| Aluminum Element | 23.6 | 6.5 | 153 | 80 | −40 | 120 | 18408 |
| Glass Fiber | 0.75 | 13.0 | 10 | 80 | −40 | 120 | 1170 |
| Total | | | | | | 0 | 18 |

The results above show that an almost negligible total change in length of 18 nm can be achieved over a 120° C. temperature change.

The selection of materials as described in the above table can provide for CTE matching of the components so that the relative position of the fiber end to ferrule end is maintained over a wide temperature range. Additionally, the exemplary connector structures described herein provide that the appropriate end load is applied to the gripped glass fiber to attain and maintain proper optical contact. This load can be applied without either overloading or underloading the fiber contact (thus reducing the risk of poor optical connection). The balance of the applied load can then be carried by the remaining structure, e.g., the ferrule 132 and collar body 120.

As mentioned above, especially with respect to the preferred aspects of FIGS. 1-6, connector 100 can provide these thermal compensation and appropriate loading characteristics by use of a flexible sidewall structure (either as a bowed structure or through a compliant material) that provides appropriate deflection versus force characteristics.

Figure 7:
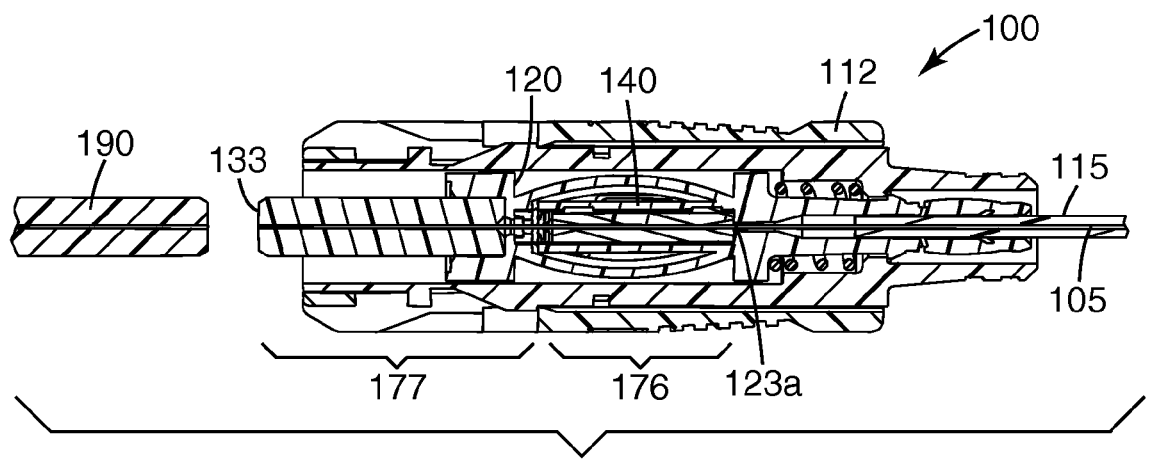
FIGS. 7-9 show schematic top views of an exemplary optical connector during connection according to an aspect of the present invention.
Figure 8:
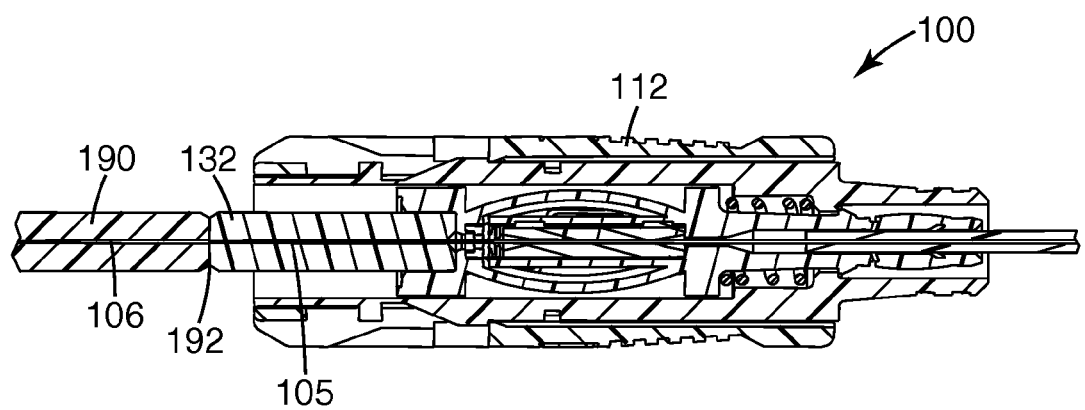
Figure 9:
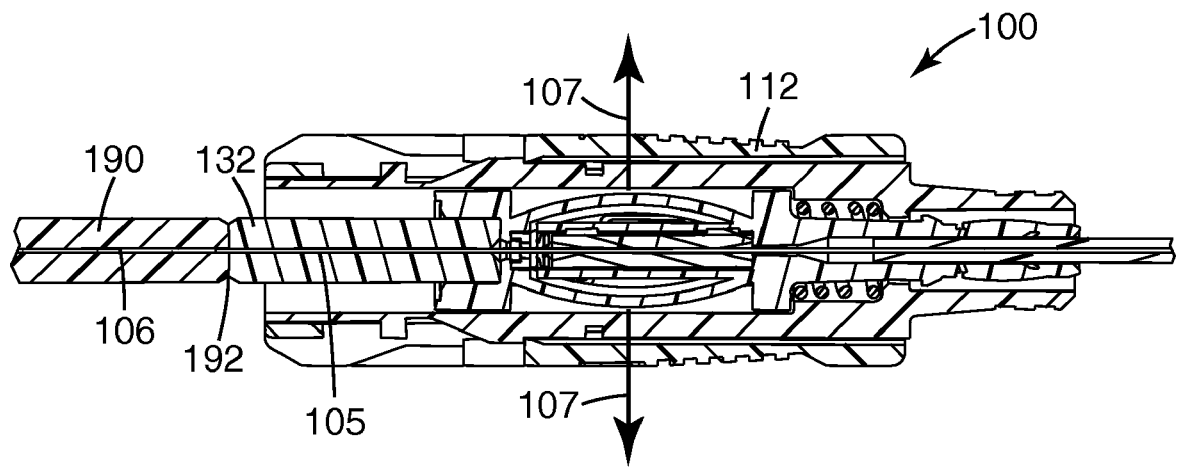
Figure 10:
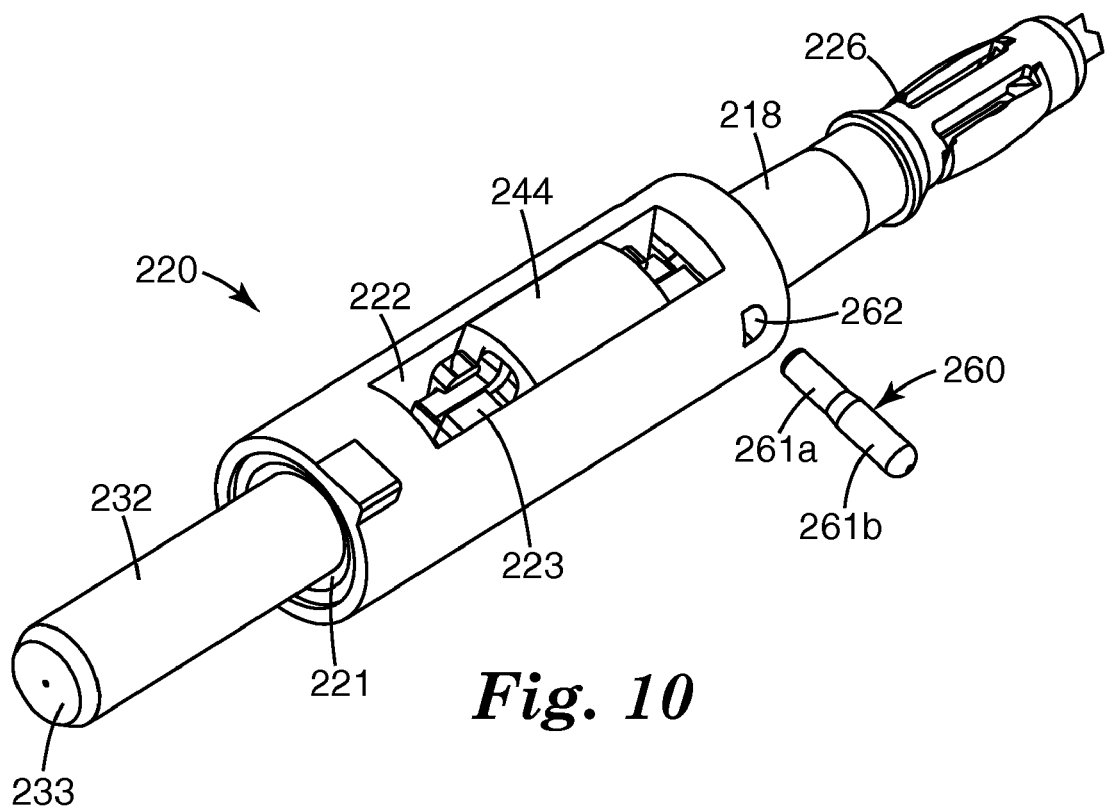
FIG. 10 is an isometric view of an exemplary collar body of an optical connector according to another aspect of the present invention.
Figure 11:
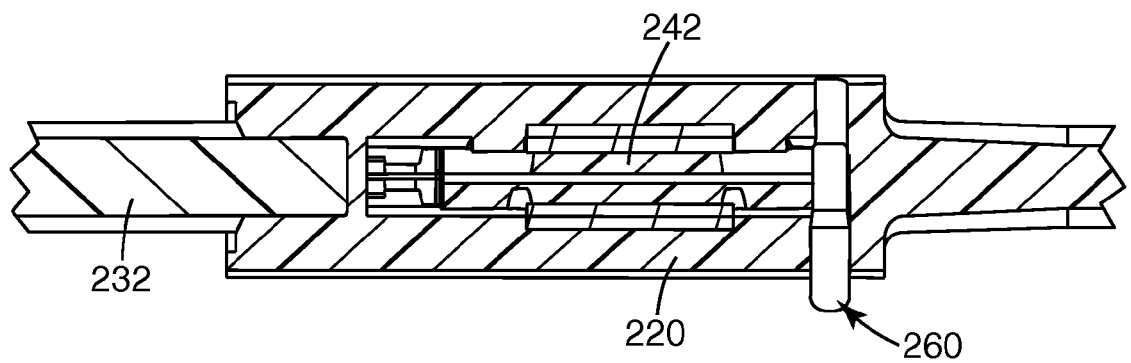
FIG. 11 is a sectioned top view of an exemplary collar body of an optical connector with a cam pin inserted to a first position according to another aspect of the present invention.
Figure 12:
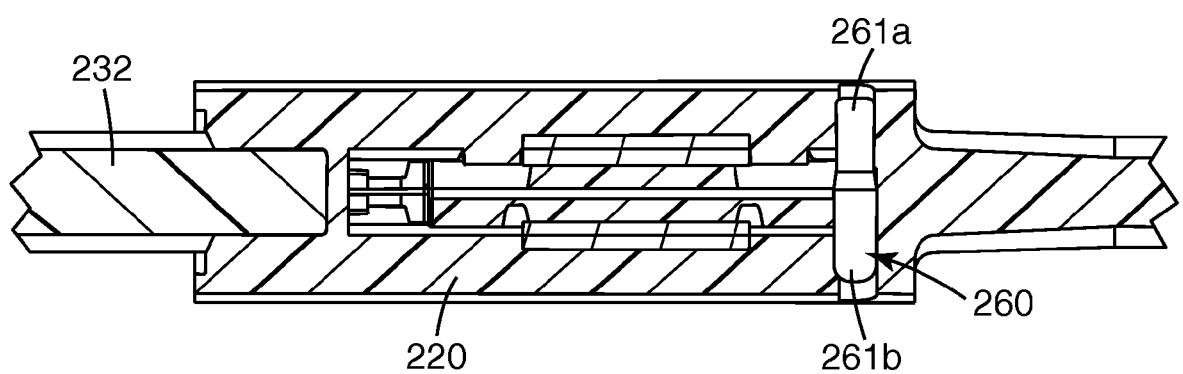
FIG. 12 is a sectioned top view of an exemplary collar body of an optical connector with a cam pin inserted to a second position according to another aspect of the present invention.
Figure 13:
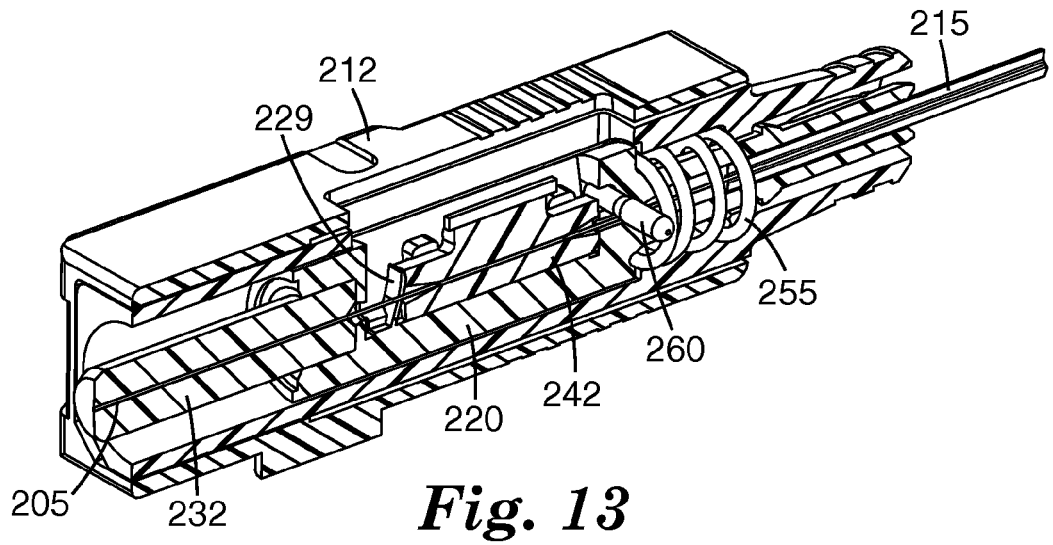
FIG. 13 is an isometric view of an exemplary connector cross-section according to another aspect of the present invention.

During connection, the structure of connector 100 can provide for a suitable distribution of forces so that an excessive amount of force is not directly applied to the fiber that could cause damage. In more detail, FIGS. 7-9 show a cross section view of exemplary connector 100 before and after mating with a second connector (represented for simplicity purposes by ferrule 190). As an illustration, the structure of connector 100 can provide two substantially parallel expansion paths (see FIG. 4)—a first path P1 comprising the gripping element and gripped fiber extending through the ferrule and a second path P2 comprising the ferrule and collar body from the ferrule end face 133 to the rear wall 123a of the housing portion 123. In a preferred aspect, these parallel expansion/contraction paths can be designed to have substantially the same effective overall CTE so that the path lengths change in substantially the same amount with a temperature change.

Prior to mating, gripping element 140 is substantially secured within the collar body 120 such that a portion of element 140 is registered against wall 123a. The region where the fiber 105 of fiber cable 115 is gripped is region 176 in FIG. 7 and the region where the fiber 105 is free to move in the ferrule is region 177. In this exemplary embodiment, the end face or tip of fiber 105 is positioned flush with ferrule end face 133. The connectors are first mated as depicted in FIG. 8, where ferrule 190 of the second connector contacts ferrule 132 of connector 100 at an interface 192. At this contact interface, fiber 105 of the first connector and fiber 106 of the second connector are also placed in contact. Spring 155 of connector 100 preloads a suitable force onto the connector body. For example, this preload force can be from about 7.8N to about 11.8N for standard Telcordia GR326 applications.

In FIG. 9, the ferrules 132 and 190 are brought into full contact force, with the tips of fibers 105 and 106 remaining flush with their respective ferrule end faces. In a preferred aspect, the ferrule will carry about 90% of the applied load and will transmit that force to the collar body 120. At the same time, the fiber will carry no more than 20% of the total load, preferably about 10% of the load in compression. Part of the force applied to the ferrule 132 is transferred to the sidewalls 127 of the collar body 120, which bow outward in the direction of arrows 107. In addition, spring 155 will be compressed. Thus, the flexible outer wall structure 127 of the collar body allows optical connector 100 to distribute contact forces in an appropriate manner so that the ferrule and fiber each take on the correct amount of force when the connector is connected.

Further aspects of connector 100 include a buffer clamping portion 126 of the collar body that can be configured to clamp the buffer portion of the optical fiber cable 115. In one aspect, buffer clamping portion 126 can be configured to include a buffer clamp as an integral part of its structure. For example, the buffer clamping configuration can includes one or more longitudinally formed slots, resulting in a collet-like shape. In addition, the inner surface of the buffer clamping portion can be formed to include ridges or shaped-barbs (not shown) as a one-way catch to allow fiber insertion and resist fiber removal.

According to an exemplary aspect, buffer clamping portion 126 can be configured to clamp a standard optical fiber buffer cladding, such as a 900 μm outer diameter buffer cladding, a 250 μm buffer cladding, or a fiber buffer cladding having an outer diameter being larger or smaller. In this exemplary embodiment, to activate the particular buffer clamping element, connector 100 can further include an actuation sleeve 160 having an opening extending therethrough that is axially slidably received by the outer surface of buffer clamping portion 126. Sleeve 160 can be formed from a polymer or metal material. Preferably, the hardness of the sleeve 160 is greater than the hardness of the material forming the buffer clamping portion 126. The operation of the sleeve/clamp mechanism, as well as the operation of alternative buffer clamp structures, are described in U.S. Pat. No. 7,280,733, incorporated by reference herein in its entirety.

To prevent sharp fiber bends at the connector/fiber interface, a boot 180 can be utilized. In an exemplary aspect, boot 180 includes a conventional tapered tail. Alternative boot structures suitable for connector 100 are described in U.S. Pat. No. 7,280,733, incorporated by reference above.

The exemplary connector shown above can provide for straightforward field fiber termination for 250 μm, 900 μm, or non-standard buffer coated optical fiber, without the need for a power source, adhesive, costly installation tools, or field polishing. For example, the exemplary connector can have an overall length of less than about 2 inches for an SC format connector for 250 or 900 micron fiber cables.

In another exemplary aspect, a field termination procedure is provided. For example, a connector, similar or the same as connector 100 shown above can be provided. An exemplary fiber cable can comprise, e.g., a 3.5 mm jacketed drop cable for a 900 μm optical fiber. The optical fiber can then be prepared by stripping and cleaving flat (or, alternatively angled) using a conventional cleaver. The fiber jacket/plastic coating can be stripped using a conventional mechanical fiber stripper. The glass portion of the fiber can be wiped clean.

After the fiber end is prepared, the stripped portion of the fiber can be inserted into the connector, particularly within the collar body until the fiber tip reaches beyond the ferrule end face 133 by a desired amount. The actuating cap 144 can be pressed onto the element 142 to grip the glass fiber and the buffer clamp can be actuated to clamp the buffer portion of the fiber.

With the fiber secured by the gripping element, in a preferred aspect, the fiber tip/ferrule end face is polished using a conventional field polishing procedure such that the fiber tip is flush with the ferrule end face. Alternatively, a field polish to produce a slight fiber protrusion can be performed. For example, in an alternative aspect, the fiber tip/ferrule can be polished while the bowed side walls of the collar body are deflected (e.g., pressed inward) in a controlled manner. This action extends the ferrule in the axial direction. When the polishing process is completed, the side walls can be returned to a normal rest state, thereby causing the ferrule to retract in the axial direction, producing a fiber protrusion.

In an alternative aspect, a more rigid collar body construction can be utilized, with a protruding fiber tip that extends a desired distance from the end face of the ferrule to establish the load distribution on contact with another connector. In this alternative aspect, the glass fiber accepts loading until the column length of the fiber is shortened at the desired preload value and the fiber tip is flush with the ferrule tip. Application of any additional load will be carried substantially by the ferrule.

Figure 14:
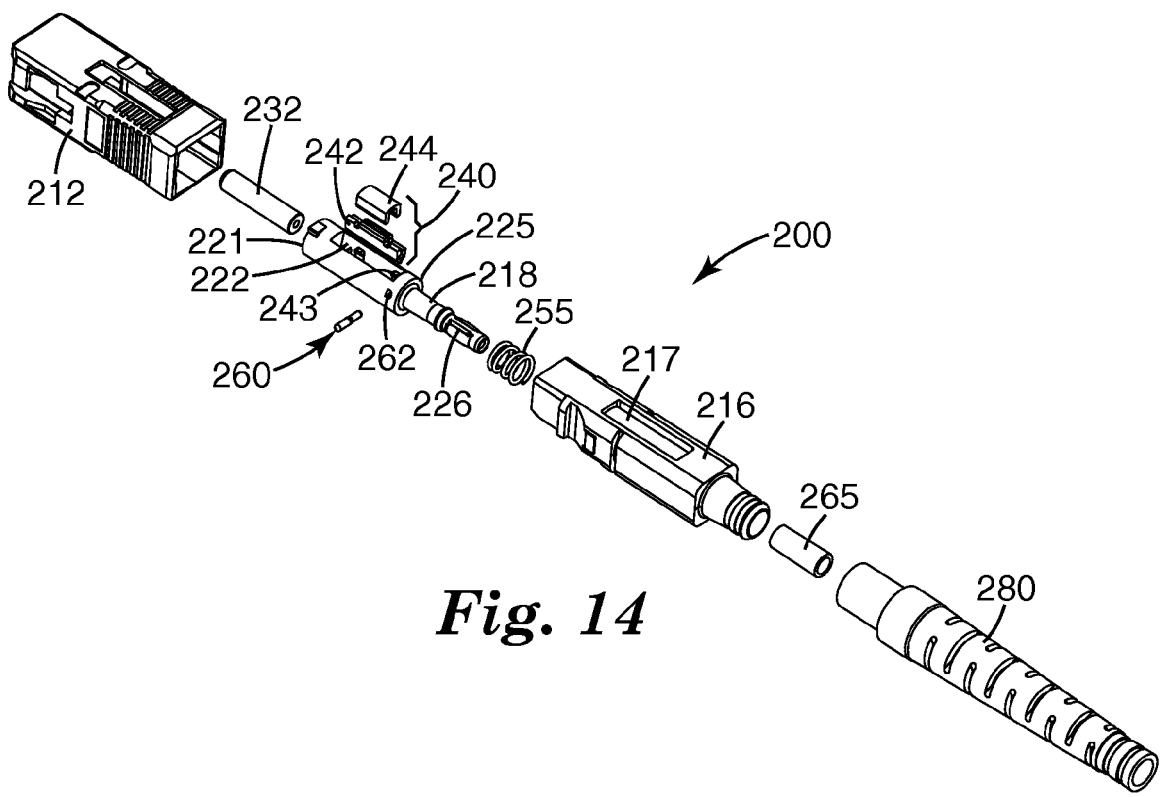
FIG. 14 is an exploded view of an exemplary optical connector according to another aspect of the present invention.

According to an alternative embodiment of the present invention, an optical fiber connector 200 is shown in exploded view in FIG. 14, with FIGS. 10-13 providing more detailed views of various components of optical connector 200. Optical connector 200 is configured to mate with a receptacle, such as a receptacle that accepts an SC, ST, FC, and/or LC connector format.

Optical fiber connector 200 can include a connector body having a housing shell 212 and a fiber boot 280. In this exemplary embodiment shell 212 is configured to be received in an SC receptacle (e.g., an SC coupling, an SC adapter, or an SC socket). A backbone 216 is housed inside the shell 112 and can provide structural support for the connector 200. In addition, backbone 216 further includes at least one access opening 217, which can provide access to actuate a gripping device disposed within the connector. Backbone 216 can further include a mounting structure 218 that provides for coupling to the fiber boot 280, which can be utilized to protect the optical fiber from bend related stress losses. Shell 212 and backbone 216 can be formed or molded from a polymer material, although metal and other suitably rigid materials can also be utilized. Shell 212 is preferably secured to an outer surface of backbone 216 via snap fit.

Connector 200 further includes a collar body 220 that is disposed within the connector housing and retained therein. Unlike collar body 120 described above, collar body 220 can comprise more rigid exterior walls. The collar body 220 can house a gripping device 240 and a fiber buffer clamp 226. Also, the collar body is configured to have some limited axial movement within backbone 216. For example, the collar body 220 can include a shoulder 225 that can be used as a flange to provide resistance against a spring 255, interposed between the collar body and the backbone, when the ferrule 232 is inserted in, e.g., a receptacle. According to an exemplary embodiment of the present invention, collar body 220 can be formed or molded from a polymer material, although metal and other suitable materials can also be utilized. For example, collar body 120 can comprise an injection-molded, integral material. The choice of suitable materials for the collar body can be made in accordance with the temperature stability parameters discussed herein.

Structurally, collar body 220 includes a first end portion 221 having an opening to receive and house ferrule 232. Ferrule 232 can be formed from a ceramic, glass, plastic, or metal material to support the optical fiber being inserted and terminated. In a first exemplary aspect, ferrule 232 is a ceramic ferrule. In another exemplary aspect, ferrule 232 is a glass ferrule. The choice of suitable materials for the ferrule can be made in accordance with the temperature stability parameters discussed herein. The fiber being terminated in the connector can comprise a standard single mode or multi-mode optical fiber. Ferrule 232 is preferably secured within the collar body portion via an epoxy or other suitable adhesive, or, alternatively, ferrule 232 may be friction fit in the first end portion 221 of the collar body 220.

Collar body 220 further includes a housing portion 223 that provides an opening 222 in which the gripping device 240 can be inserted in the central cavity of collar body 220. In an exemplary embodiment, the collar body provides for an axial displacement of the gripping device 240 to provide a predetermined fiber protrusion distance.

In an exemplary embodiment, the gripping device 240 can include an element 242 and an actuating cap 244. Gripping element 242 is mountable in the housing portion 223 of collar body 220 within a fixed element cradle or nest 243. In a preferred aspect, the gripping element 242 comprises a sheet of ductile material having a focus hinge that couples two legs, where each of the legs includes a fiber gripping channel to optimize clamping forces for a conventional glass optical fiber received therein. The ductile material, for example, can be aluminum or anodized aluminum.

Alternatively, gripping device 240 can be designed to have a shape similar to that of a conventional mechanical splice device, as would be apparent to one of ordinary skill in the art. For example, in one alternative aspect, the gripping device can include a wedge actuated mechanical gripping element.

Cap 244 is preferably configured to engage the gripping element 142 such that the element 242 grips the fiber 205 inserted therein. The cap can be formed or molded from a polymer material, although metal and other suitable materials can also be utilized. In a preferred aspect, the cap 244 can be formed from a material being the same as or similar to the material forming the element 242. Also, the cap's size is designed to freely fit within housing portion 223 such that when it has fully engaged the element 242, the cap 244 is not restricted from axial movement with the element 142.

In operation, as the cap 244 is moved from an open position to a closed position (e.g. downward in the embodiment depicted in FIG. 14), one or more cam bars located on an interior portion of the cap 244 can slide over the element legs, urging them toward one another. The glass portion of the fiber 205 is placed in the groove of the element 242 and is gripped as the element legs are moved toward one another by the cap 244. Thus, once clamped, the fiber may move within the ferrule.

When the element 242 is placed in the cradle or nest 243, a portion of the element is registered against a first portion 261a of a cam pin 260. The other portion of the element 242 is positioned against the elastic element 229, such as a spring arm. Cam pin 260 is a cylindrically-shaped structure that can be inserted into the housing portion of the collar body through hole 262 transverse to the fiber axis. A guide or groove structure (not shown) can hold pin 260 in place as to provide a register for the element 242.

In a preferred aspect, cam pin 260 has a first portion 261a, having a first diameter, and a second portion 261b having a second diameter larger than the first diameter. Thus, after polishing the fiber and ferrule end face, then pin 260 can be further inserted so that the element 242 is further axially displaced by the wider second portion 261b, moving the fiber forward with respect to the end face to create a fiber protrusion. The diameters of the cam pin 260 can be selected to provide a predetermined translation, such that a predetermined fiber protrusion is achievable through a camming mechanism. Alternatively, cam pin 260 cam be structured as an eccentric cylinder such that a ½ turn rotation provides a camming action that displaces the element 242 and cap 244. Actuation of the cam pin can be achieved through the use of a simple tool (not shown) that can access the cam pin 260 through an access hole provided in the backbone 216. In a further alternative, a wedge-shaped structure can provide a displacement to the element 242 and cap 244 as the wedge is inserted into the housing portion 223.

In a preferred aspect, the fiber 205 will protrude a distance of from about 10 µm to about 25 µm, more preferably about 10 µm-20 µm. This amount can be determined based on the desired force that is to be applied to the fiber during connection.

Figure 15:
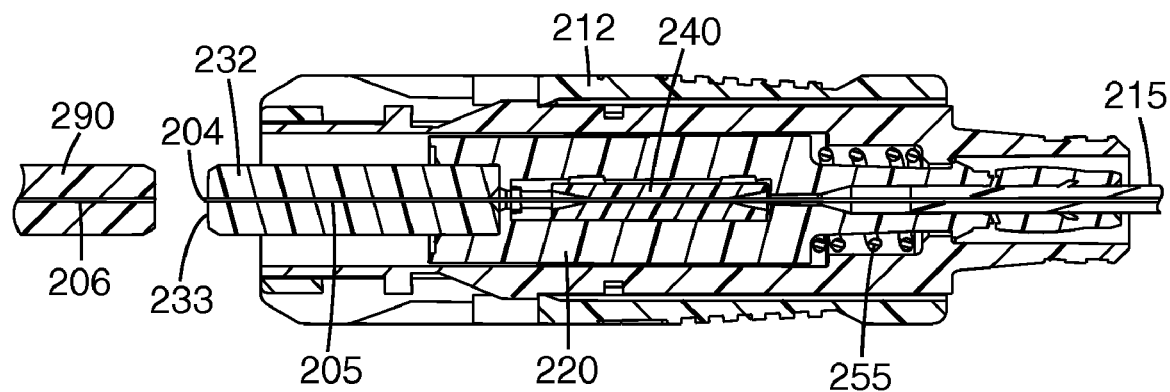
FIGS. 15-16 show schematic top views of an exemplary optical connector during connection according to another aspect of the present invention.

During connection, the structure of connector 200 can provide for a suitable distribution of forces so that an excessive amount of force is not directly applied to the fiber that could cause damage. In more detail, FIGS. 15 and 16 show a cross section view of exemplary connector 200 before and after mating with a second connector (represented for simplicity purposes by ferrule 290).

Prior to mating, gripping element 240 is substantially secured within the collar body 220 and the cam pin 260 is actuated such that fiber tip 204 protrudes from the ferrule end face 233 by a predetermined amount (the fiber 205 is preferably polished flush with end face 233 prior to this actuation, as is described below). Fiber 205 of fiber cable 215 is gripped by the element and the fiber 205 may move in the ferrule 232.

Figure 16:
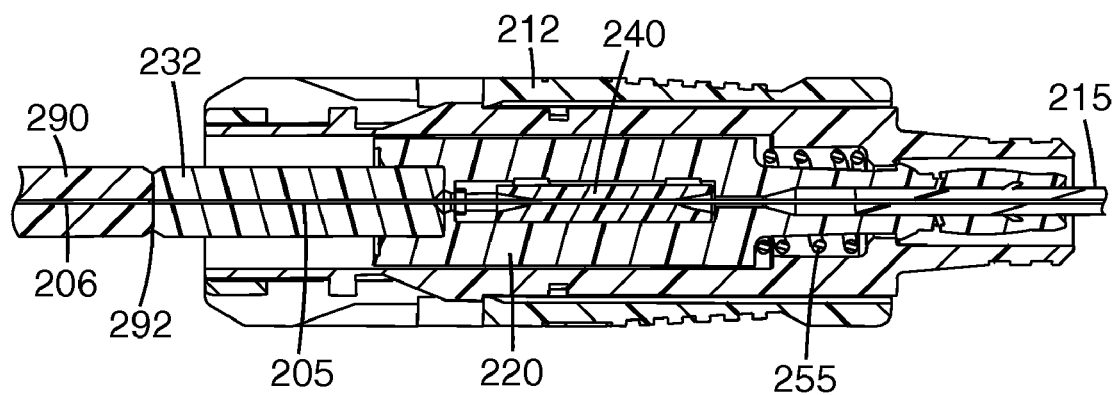

The connectors are first mated as depicted in FIG. 16, where fiber tip 204 first contacts fiber 206 of the second connector. Fiber 205 is then compressed by the pressing force until the ferrule end faces meet at interface 292. At this contact interface, the ferrule 232 then is subject to the remaining force from the second connector. Spring 255 of connector 200 preloads a suitable force onto the connector body 220.

For example, the total mated end force between connectors can be from about 7.8N to about 11.8N. With a 10 µm-20 µm fiber protrusion, the fiber 205 will be subject to an end load of from about 0.6N to about 1.4N, which ensures suitable optical contact. The balance of the load will be born by the ferrule 232 and the collar body 220. In this embodiment, as compared to the embodiment of connector 100, the stiffness/rigidity of the collar body and ferrule assembly is about 1000 times the stiffness of the fiber column. Thus, once the fiber compresses (or deflects) to a point flush with the end of the ferrule upon initial contact, the ferrule 232 will bear the large majority of the remaining load.

Further aspects of connector 200 include a buffer clamping portion 226 of the collar body that can be configured to clamp the buffer portion of the optical fiber cable 215. The buffer clamp can be configured in a manner the same as or similar to buffer clamp 126 described above.

According to an exemplary aspect, buffer clamping portion 226 can be configured to clamp a standard optical fiber buffer cladding. In this exemplary embodiment, to activate the particular buffer clamping element, connector 200 can further include an actuation sleeve 265 having an opening extending therethrough that is axially slidably received by the outer surface of buffer clamping portion 226. Sleeve 265 can be formed from a polymer or metal material. The operation of the sleeve/clamp mechanism is described above.

To prevent sharp fiber bends at the connector/fiber interface, a boot 280 can be utilized. In an exemplary aspect, boot 280 includes a conventional tapered tail. The boot 280 may have an alternative structure, as is described above.

In another exemplary aspect, a field termination procedure is provided. For example, a connector, similar or the same as connector 200 shown above can be provided. An exemplary fiber cable can comprise, e.g., a 3.5 mm jacketed drop cable for a 900 µm optical fiber. The optical fiber can then be prepared by stripping and cleaving flat using a conventional cleaver. The fiber jacket/plastic coating can be stripped using a conventional mechanical fiber stripper. The glass portion of the fiber can be wiped clean.

After the fiber end is prepared, the stripped portion of the fiber can be inserted in the connector, particularly within the collar body until the fiber tip reaches beyond the ferrule end face 233 by a desired amount. The actuating cap 244 can be pressed onto the element 242 to grip the glass fiber and the buffer clamp 226 can be actuated to clamp the buffer portion of the fiber.

With the fiber secured by the gripping element, in a preferred aspect, the fiber tip/ferrule end face is polished using a conventional field polishing procedure such that the fiber tip is flush with the ferrule end face. Alternatively, a field polish to produce a slight fiber protrusion can be performed.

After the fiber is polished flush with the ferrule end face, the camming pin can be inserted to axially displace the gripping device 240 so that the fiber tip protrudes by a desired amount, for example, from about 10 μm to about 20 μm.

Figure 17A:
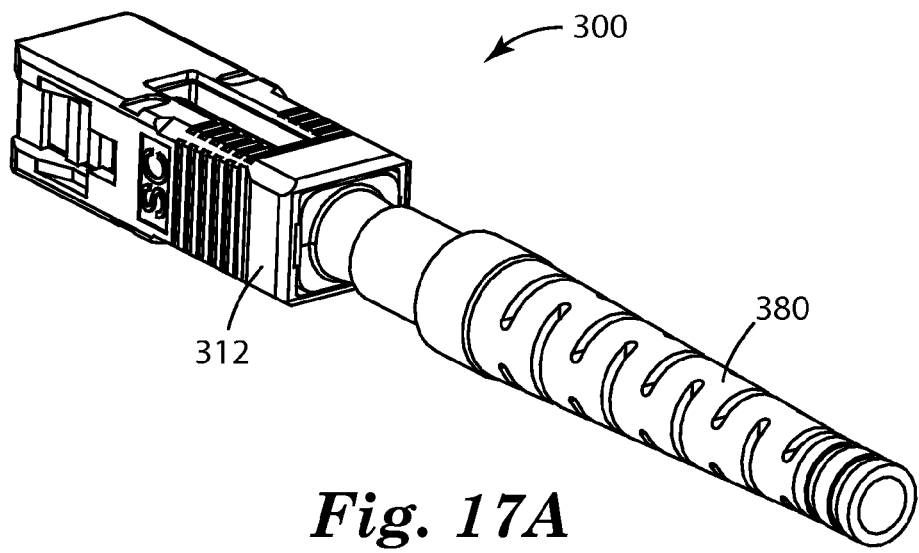
FIG. 17A is an isometric view of an exemplary optical connector according to another aspect of the present invention.
Figure 17B:
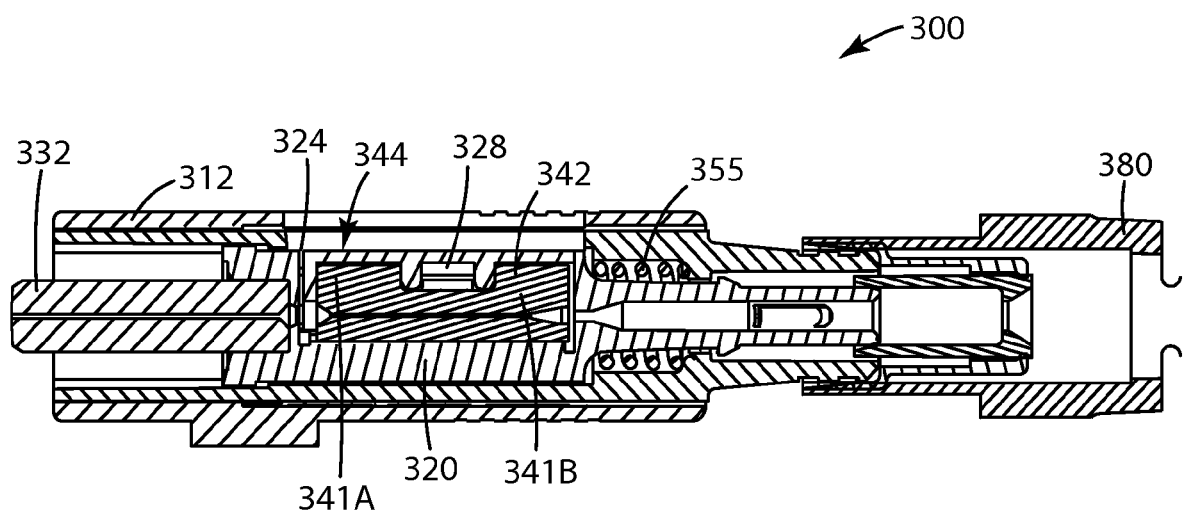
FIG. 17B is a cross-sectional view of the exemplary optical connector of FIG. 17A according to another aspect of the present invention.
Figure 17C:
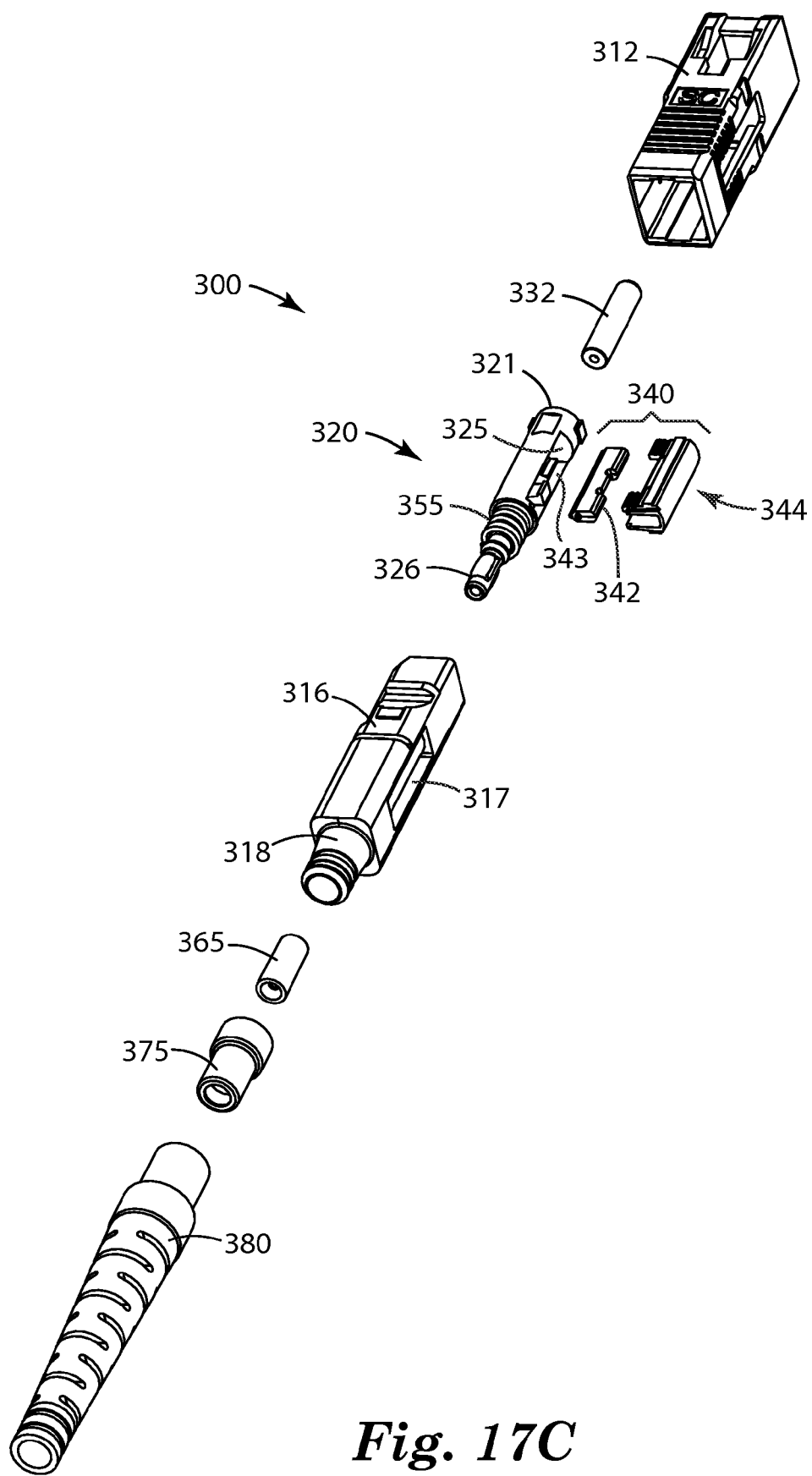
FIG. 17C is an exploded view of the exemplary optical connector of FIG. 17A according to another aspect of the present invention.

According to another alternative embodiment of the present invention, an optical fiber connector 300 is shown in exploded view in FIG. 17C, with FIGS. 17A-17B, 17D, 18A-18D and 19A-19B providing more detailed views of various components of optical connector 300. Optical connector 300 is configured to mate with a receptacle, such as a receptacle that accepts an SC, ST, FC, and/or LC connector format.

Optical fiber connector 300 can include a connector body having a housing shell 312 and a fiber boot 380. In this exemplary embodiment shell 312 is configured to be received in an SC receptacle (e.g., an SC coupling, an SC adapter, or an SC socket). As shown in FIG. 17C, a backbone 316 can be housed inside the shell 312 and can provide structural support for the connector 300. In addition, backbone 316 further includes at least one access opening 317, which can provide access to actuate a gripping device disposed within the connector. Backbone 316 can further include a mounting structure 318 that provides for coupling to the fiber boot 380. Shell 312 and backbone 316 can be formed from the materials described above. Shell 312 is preferably secured to an outer surface of backbone 316 via snap fit.

Connector 300 further includes a collar body 320 that is disposed within the connector housing and retained therein. The collar body is configured to have some limited axial movement within backbone 316. For example, the collar body 320 can include a shoulder that can be used as a flange to provide resistance against a spring 355, interposed between the collar body and the backbone, when the ferrule 332 is inserted in, e.g., a receptacle.

The collar body 320 can house a gripping device 340 and a fiber buffer clamp 326. The griping device 340 includes a gripping element 342 and an actuating cap 344 and can be seated within nest 343 of collar body 320. Unlike collar body 120 described above, collar body 320 can comprise rigid exterior walls.

In a preferred aspect, optical connector 300 includes a collar body 320 and an actuation cap 344 made from the same material, but each having a different CTE in the direction of the fiber axis. In particular, the actuation cap has a CTE in the direction of the fiber axis that is substantially different from the CTE of the collar body in this same direction. As a result, the optical fiber connector can be thermally balanced over a substantial (i.e., greater than 100° C.) temperature range (e.g., from −40° C. to 80° C.).

Structurally, collar body 320 includes a first end portion 321 having an opening to receive and house ferrule 332. Ferrule 332 can be formed from a ceramic, glass, plastic, or metal material to support the optical fiber being inserted and terminated. In a first exemplary aspect, ferrule 332 is a ceramic ferrule. In another exemplary aspect, ferrule 332 is a glass ferrule. The fiber being terminated in the connector can comprise a standard single mode or multimode optical fiber. Ferrule 332 is preferably secured within the collar body portion via an epoxy or other suitable adhesive, or, alternatively, ferrule 332 may be friction fit in the first end portion 321 of the collar body 320. In this exemplary aspect, collar body 320 can be formed or molded from a polymer material, in particular, a polymer material having an anisotropic CTE.

In this exemplary aspect, the gripping device 340 includes an element 342 and an actuating cap 344. Gripping element 342 is mountable in the housing portion of collar body 320 within an element cradle or nest 343. In a preferred aspect, the gripping element 342 comprises a sheet of ductile material having a focus hinge that couples two legs, where each of the legs includes a fiber gripping channel to optimize clamping forces for a conventional glass optical fiber received therein. The ductile material, for example, can be aluminum or anodized aluminum.

In this alternative aspect, element 342 has a different shape from elements 142 and 242 described above. In particular, element 342 includes separate first and second clamping zones 341A and 341B, respectively, to engage with cap 344. In addition, a recess can be formed between clamping zones 341A and 341B. With this structure, the collar body 320 can further include a tab 328 that extends over the element recess to keep the element 342 in place when the cap is in a non-actuated position or when the cap is being moved from an actuated position to a non-actuated position.

Figure 17D:
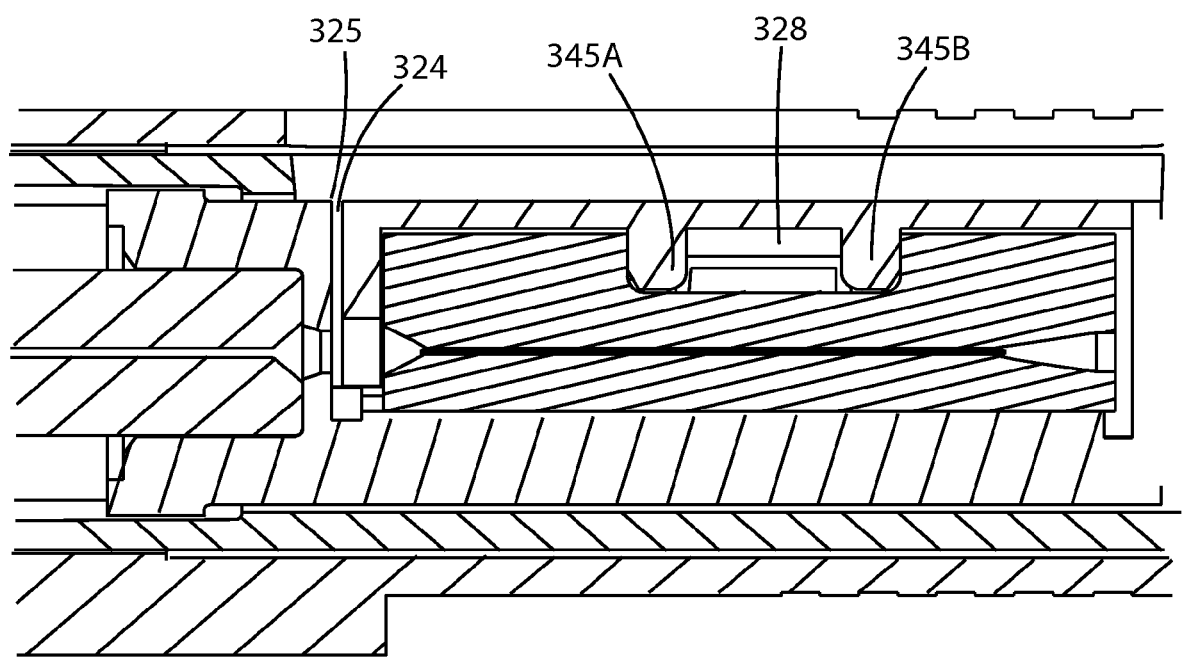
FIG. 17D is a close-up cross-sectional view of the exemplary optical connector of FIG. 17A according to another aspect of the present invention.

Cap 344 is preferably configured to engage the gripping element 342 such that the element 342 securely grips a fiber inserted therein. In this exemplary aspect, as is shown in FIGS. 17B and 17D, the cap walls snugly fit around the element 342. In operation, as the cap 344 is moved from an open position to a closed position (e.g. downward in the embodiment depicted in FIG. 17C), one or more cam bars located on an interior portion of the cap 344, such as the cams 343A and 343B shown in the cross-section view of FIG. 18D, can slide over the element legs in one or more clamping zones, urging them toward one another. In one aspect, the inner surface of cap 344 includes cam portions 343A and 343B disposed on the interior surfaces thereof that provide a different clamping force to clamping zone 341A than the clamping force applied to clamping zone 341B. The cam bars can extend partially or fully along the axial length of the actuating cap 344. In one preferred aspect, the gripping force applied to clamping zone 341A (closest to the ferrule 332) is greater than the clamping force applied to clamping zone 341B. In a further exemplary aspect, the clamping force applied to clamping zone 341B can be substantially zero.

The glass portion of a fiber is placed in the groove of the element 342 and is gripped as the element legs are moved toward one another by the cap 344. In a preferred aspect, the fiber will protrude a distance of from about 10 μm to about 25 μm, more preferably about 10 μm-20 μm. This amount can be determined based on the desired force that is to be applied to the fiber during connection.

Figure 18A:
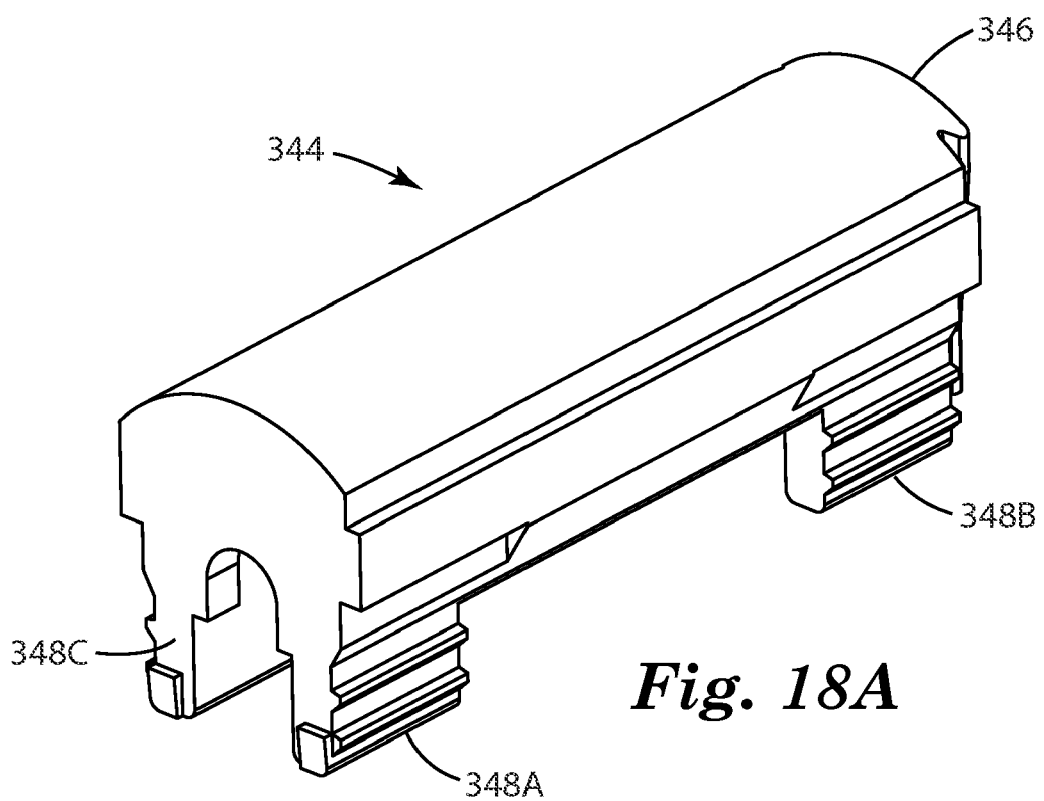
FIGS. 18A-18D show different views of the actuating cap of the exemplary optical connector of FIG. 17A according to another aspect of the present invention.
Figure 18B:
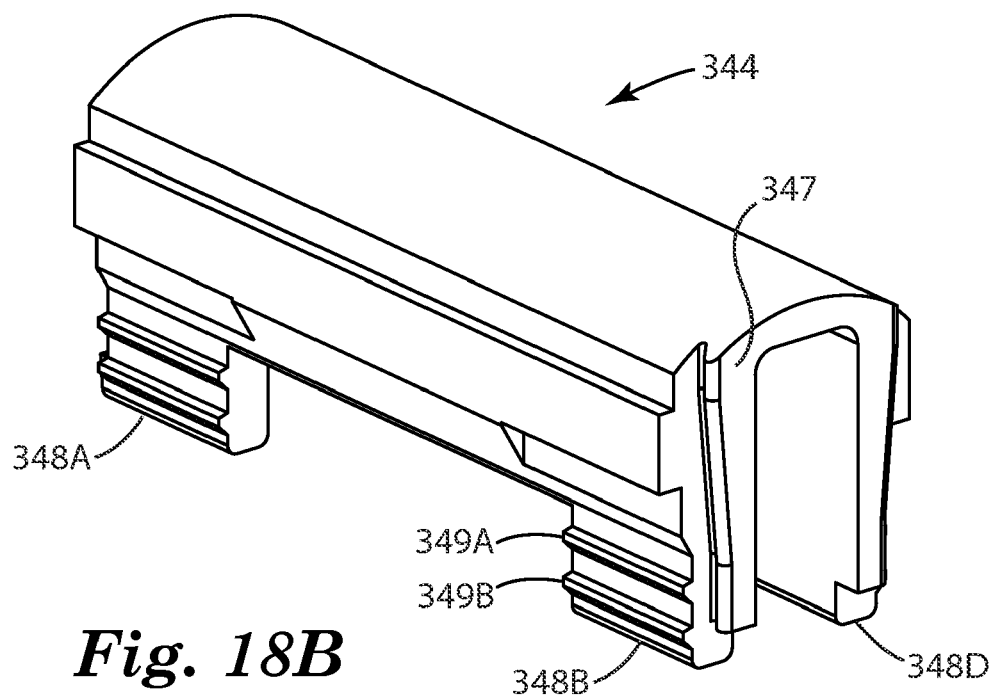
Figure 18C:
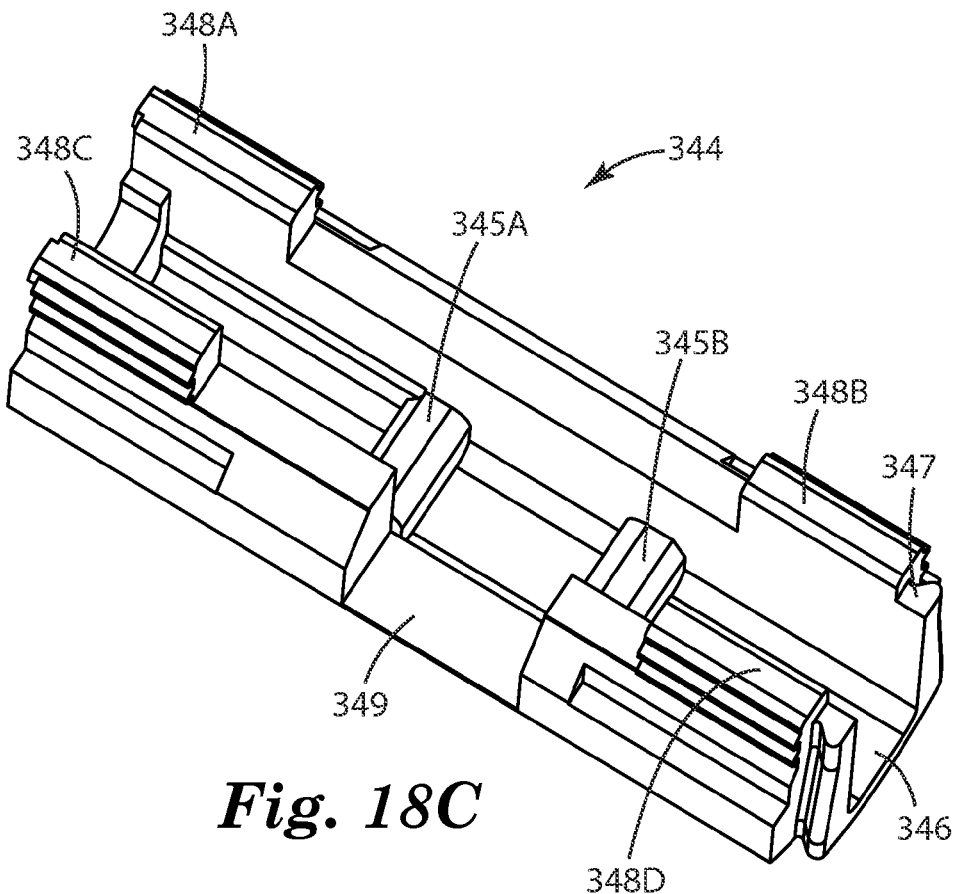
Figure 18D:
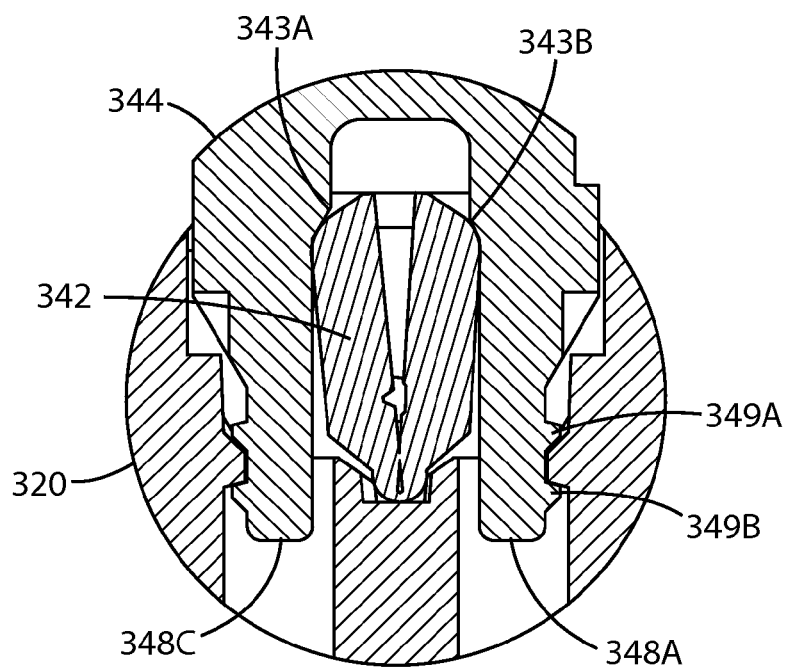

In particular, in this alternative aspect, cap 344 includes four retention legs 348A-348D (see e.g., FIGS. 18A-18B) to retain the position of the cap within the collar body 320. For example, each of the retention legs 348A-348D can include detents 349A and 349B formed on an outer surface thereof, such as shown in FIGS. 18B and 18D. The first detent(s) 349A can be used to place the cap securely within the nest 343 of the collar body prior to actuation. As the cap 344 is fully actuated onto the element 342, the second detent(s) 349B can engage with the collar body to further secure the cap 344 in place.

Further, in this exemplary aspect, cap 344 can include reinforcing walls at both ends of the camming surfaces on the underside of the cap. These walls can provide structural strength to hold the element 342 legs in their actuated position. In addition, the underside of cap 344 can include underside surface ridges 345A and 345B (see e.g., FIG. 18C) that engage the element 342 between the raised clamping zones 341A and 341B (see e.g., FIGS. 17B and 17D). These surface ridges 345A and 345B can maintain the relative axial position of the element 342 while in use.

In this exemplary aspect, the gripping device 340, particularly cap 344, is secured to a portion of the collar body 320 and thus has controlled axial movement due to thermal expansion. For example, cap 344 is designed to securely engage with collar body 320 so that the cap and collar body are registered to the same point. For example, cap 344 can include a dove-tail/ridge 347 formed on side 346 (see e.g., FIGS. 19A and 19B—the cap side disposed away from the ferrule 332) that engages (e.g., by sliding fit) with a corresponding slot 327 formed in the opening of the collar body. To provide for controlled axial expansion under changing thermal conditions, the cap 344 is designed to have an axial length that, when fully seated in the collar body, leaves a small air gap or opening 324 between a front edge of the cap and a front interior wall 325 of the collar body (see e.g., FIG. 17D). In an exemplary aspect, aside from the registration point or side, the cap/element can have minimal other contact with the collar body, to reduce the effects of friction during thermal expansion.

According to a preferred aspect of this embodiment, the collar body and cap can be formed or molded from the same polymer material. For example, the cap 344 and collar body 320 can both be formed from a liquid crystal polymer (LCP). A LCP such as VECTRA LCP A130, available from the Ticona Company, can be utilized. However, in this exemplary aspect, the cap 344 has a CTE, in the direction of the fiber axis, which is substantially different from the CTE of the collar body 320 in this same direction. As such, the distance between the element 342 and the ferrule 332 decreases in a controlled fashion with increasing temperature. With this structure, the element 342 is constrained along its primary axis within the connector by the cap, as opposed to the collar body.

Figure 19A:
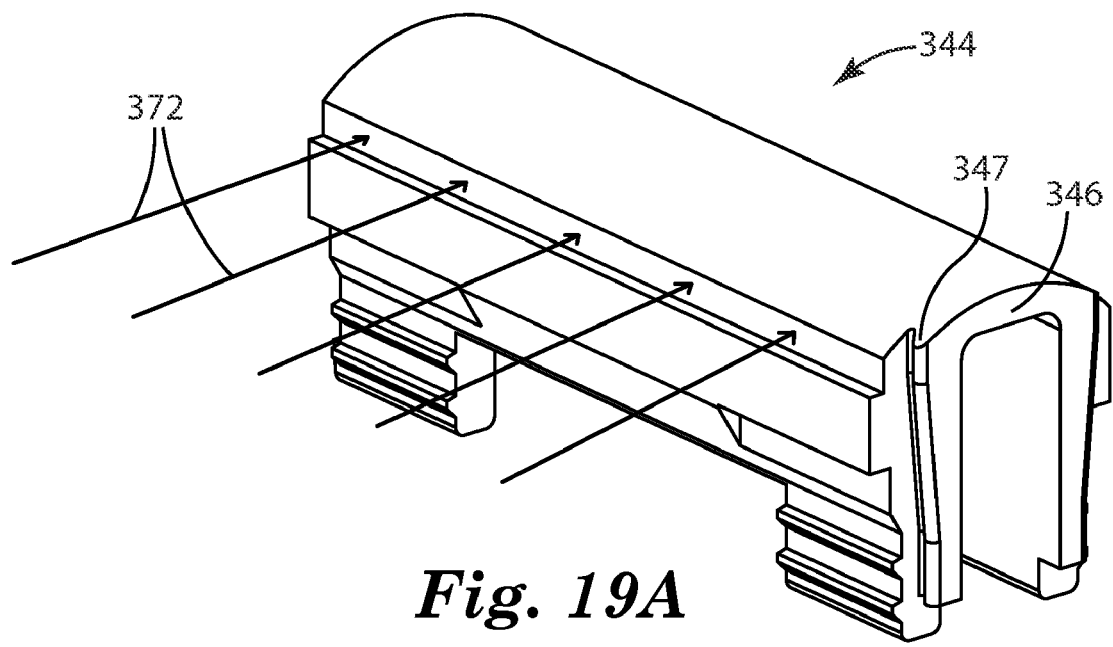
FIGS. 19A and 19B respectively show isometric views of the cap and collar body and the direction of injection flow of material during molding according to another aspect of the present invention.
Figure 19B:
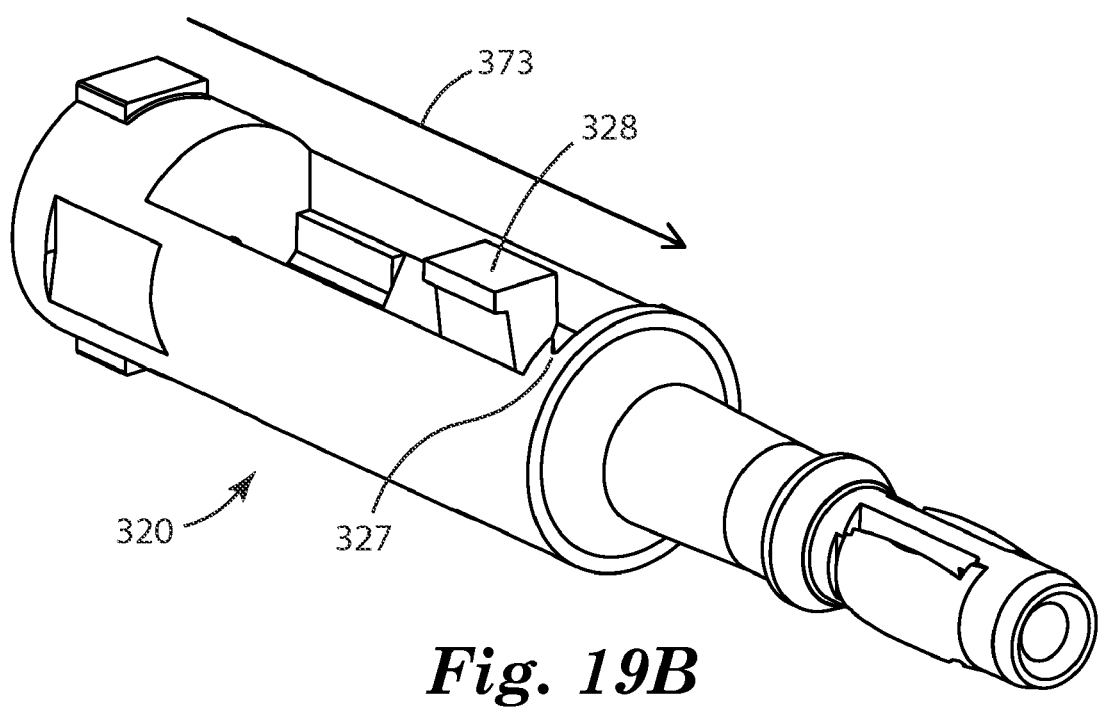

The LCP material exhibits a first CTE in the direction of flow during the molding process and a second CTE (different from the first CTE) in an orthogonal direction to the flow direction. In this exemplary aspect, the first CTE is less than the second CTE. Accordingly, as is shown in FIGS. 19A and 19B, the cap 344 and collar body 320 can be manufactured such that the cap 344 is formed by injection molding the LCP material in the direction of arrows 372, while the collar body 320 is formed by injection molding the LCP material in the direction of arrow 373, which is orthogonal to the direction of arrows 372. In this manner, the cap 344 can have a CTE in the axial direction similar to the CTE of a metal element 342.

In this exemplary aspect, the CTE of the cap and element, along their major axis, is selected to be greater than that of the body. As such the front end of the element (closest to the ferrule) can move closer to the back end of the ferrule with increasing temperature.

Table 2 provides data corresponding to the change in length of various components of optical connector 300 due to changing temperature over a 120° C. temperature change. In this example, the ferrule is chosen to be a ceramic material, the cap and collar body are formed from a Vectra LCP A130 material, but the flow directions of the materials are orthogonal (collar flow direction=parallel to fiber axis), and the fiber is formed of substantially silica (glass). The CTE values are given with respect to the direction of the fiber axis.

TABLE 2

Table of Length Changes with Temperature

|  | CTE ppm/° C. | Length mm | dL/dT nm/° C. | Tmax ° C. | Tmin ° C. | ΔT ° C. | ΔL nm |
|---|---|---|---|---|---|---|---|
| Ceramic Ferrule | 10.6 | 10.5 | −111.3 | 80 | −40 | 120 | −13356 |

TABLE 2-continued

Table of Length Changes with Temperature

|  | CTE ppm/° C. | Length mm | dL/dT nm/° C. | Tmax ° C. | Tmin ° C. | ΔT ° C. | ΔL nm |
|---|---|---|---|---|---|---|---|
| Collar Body (Vectra) | 6.0 | 10.5 | −63.0 | 80 | −40 | 120 | −7560 |
| Cap (Vectra ⊥) | 18.5 | 9.0 | 166.5 | 80 | −40 | 120 | 19980 |
| Glass Fiber | 0.7 | 12.0 | 7.8 | 80 | −40 | 120 | 936 |
| Total |  |  | 0 |  |  |  | 0 |

The results above show that the connector 300 can be formed such that there can be practically complete (total ΔL=0) thermal balance over a substantial temperature change. Note that the CTE for the cap can be relatively close in value to the CTE of an aluminum element (See Table 1), even though the materials are different. Also note that components of the same material can have significantly different CTEs (as a function of direction) based on their manufacturing. The selection of materials can thus provide for CTE matching of the components so that the relative position of the fiber end to ferrule end is maintained over a wide temperature range.

Further aspects of connector 300 include a buffer clamping portion 326 of the collar body that can be configured to clamp the buffer portion of the optical fiber cable. The buffer clamp can be configured in a manner the same as or similar to buffer clamp 126 described above.

According to an exemplary aspect, buffer clamping portion 326 can be configured to clamp a standard optical fiber buffer coating, similar to that described above. Sleeve 365 can be formed from a polymer or metal material. The operation of the sleeve/clamp mechanism 365 is similar to that described above for sleeves 160 and 265.

In addition, connector 300 can further include a retention or crimp device 375. Device 375 is configured to retain the buffer clamping sleeve 365 in place prior to fiber termination. In addition, in some applications, device 375 can be used as a support structure in combination with a first crimp ring (not shown) to crimp strength members, such as aramid strength members, utilized in conventional optical fiber cables.

To prevent sharp fiber bends at the connector/fiber interface, a boot 380 can be utilized. In an exemplary aspect, boot 380 includes a conventional tapered tail. The boot 380 may have an alternative structure, as is described above. In addition, connector 300 can be supplied with an additional crimp ring (not shown) positioned at the rear portion of the boot 380 to crimp the fiber cable jacket.

Connector 300 is a field terminable connector. As such, a field termination procedure similar to that described above can be utilized.

The optical connectors described above can be used in many conventional optical connector applications such as drop cables and/or jumpers. The optical connectors described above can also be utilized for termination (connectorization) of optical fibers for interconnection and cross connection in optical fiber networks inside a fiber distribution unit at an equipment room or a wall mount patch panel, inside pedestals, cross connect cabinets or closures or inside outlets in premises for optical fiber structured cabling applications. The optical connectors described above can also be used in termination of optical fiber in optical equipment. In addition, one or more of the optical connectors described above can be utilized in alternative applications. Moreover, the connectors described above are designed to be more insensitive to temperature changes and thus can be utilized in a larger range of applications, such as outside plant applications.

Various modifications, equivalent processes, as well as numerous structures to which the present invention may be applicable will be readily apparent to those of skill in the art to which the present invention is directed upon review of the present specification.

We claim:

1. An optical fiber connector, comprising:
   a housing configured to mate with a receptacle; and
   a collar body disposed in the housing, the collar body including
      a ferrule securely disposed in an opening of the collar body, the ferrule including a central bore that defines an axis,
      a flexible wall structure, and
      a housing portion disposed in a generally central portion of the collar body and having an opening to receive a gripping device to grip an optical fiber, wherein the ferrule is axially moveable independent of the axial movement of the optical fiber and gripping device, wherein the gripping device includes a gripping element and an actuating cap, wherein the gripping element comprises a ductile material having a focus hinge that couples first and second element legs, each of the legs including a fiber gripping channel to clamp an optical fiber received therein upon actuation by the actuating cap.

2. The optical fiber connector of claim 1, wherein the housing portion of the collar body includes a nest to receive the gripping element, wherein a first portion of the received gripping element is registered against an inner wall of the housing portion and a second portion of the received gripping element engages an elastic element disposed in the housing portion of the collar body.

3. The optical connector of claim 2, wherein the elastic element comprises a spring arm.

4. The optical connector of claim 1, wherein the actuating cap comprises one or more cam bars located on an interior portion of the cap that engage the element legs, urging the element legs toward one another, during actuation, wherein the cap is configured to freely fit within the housing portion such that upon actuation the cap expands and contracts with the gripping element during changes in operating temperature.

5. The optical connector of claim 1, wherein the gripping element and actuating cap are formed from a same material.

6. The optical connector of claim 1, wherein the collar body further includes a buffer clamp to clamp a buffer portion of the optical fiber cable that houses the optical fiber.

7. The optical fiber connector of claim 1, wherein the ferrule and collar body define a first path and the gripped optical fiber and gripping device form a second path, wherein the first and second paths have substantially the same effective overall CTE so that the path lengths change in substantially the same amount with a temperature change.

8. The optical fiber connector of claim 1, wherein upon actuation of the gripping device and upon connection of the optical fiber connector to one of a connector coupling, a connector adapter and a connector socket, an end load of less than about 20% of a total load force is directly applied to the optical fiber.

9. The optical fiber connector of claim 1, wherein the flexible wall structure comprises bowed outer walls of the collar body, wherein a portion of a displacement force applied to the ferrule is transferred to the bowed outer walls.

10. An optical fiber connector, comprising:
    a housing configured to mate with a receptacle;
    a collar body disposed in the housing, the collar body including
       a ferrule securely disposed in an opening of the collar body, the ferrule including a central bore that defines an axis, and a housing portion disposed in a generally central portion of the collar body and having an opening to receive a gripping device to grip an optical fiber, wherein the ferrule is axially moveable independent of the axial movement of the optical fiber and gripping device; and
    a cam pin, wherein, when the gripping element is disposed in the housing portion, a portion of the gripping device registers against a first portion of the cam pin, and wherein the cam pin engages the gripping device such that gripping device is axially displaced towards the ferrule upon actuation of the cam pin to generate a fiber protrusion.

11. The optical fiber connector according to claim 10, wherein the cam pin is received by a through hole formed in the collar body transverse to the fiber axis, wherein the cam pin comprises a cylindrically-shaped structure insertable into the through hole.

12. The optical fiber connector of claim 11, wherein the cam pin includes a first portion having a first diameter and a second portion having a second diameter larger than the first diameter.

13. The optical fiber connector of claim 10, wherein upon actuation of the gripping device and upon connection of the optical fiber connector to one of a connector coupling, a connector adapter and a connector socket, an end load of less than about 20% of a total load force is directly applied to the optical fiber.

14. An optical fiber connector, comprising:
    a housing configured to mate with a receptacle;
    a gripping device to grip an optical fiber, the gripping device including a fiber gripping element and an actuating cap configured to engage the gripping element; and
    a collar body disposed in the housing, the collar body including
       a ferrule securely disposed in an opening of the collar body, the ferrule including a central bore that defines an axis, and
       a housing portion disposed in a generally central portion of the collar body and having an opening to receive the gripping device, wherein the gripping element comprises a ductile material having a focus hinge that couples first and second element legs, each of the legs including a fiber gripping channel to clamp an optical fiber received therein upon actuation by the actuating cap, wherein the cap is registered to the collar body, wherein the ferrule is axially moveable independent of the axial movement of the optical fiber and gripping device, wherein the collar body and cap are formed of a first material, wherein the element is formed of a second material, and wherein the first and second materials each have a CTE such that a relative position of an end of the optical fiber gripped in the gripping device with respect to an end of the ferrule is maintained over a temperature range of at least 100° C.

15. The optical fiber connector of claim 14, wherein the actuation cap has a CTE in a fiber axis direction that is substantially different from a CTE of the collar body in the same fiber axis direction.

16. The optical fiber connector of claim 15, wherein the actuation cap has a CTE in a fiber axis direction that is greater than the CTE of the collar body in the same fiber axis direction.

17. The optical fiber connector of claim 14, wherein the actuation cap has an axial length that, when fully seated in the collar body, leaves an air gap between a front edge of the actuation cap and a front interior wall of the collar body.

* * * * *